(12) United States Patent
Johnson et al.

(10) Patent No.: US 12,299,718 B1
(45) Date of Patent: May 13, 2025

(54) CUSTOMIZABLE VOICE MESSAGING PLATFORM

(71) Applicant: Robin Voice, Inc., Dallas, TX (US)

(72) Inventors: Eric Johnson, Dallas, TX (US); Patrick Williamson, Atlanta, GA (US); Chad Nickell, Siler City, NC (US)

(73) Assignee: Robin Voice, Inc., Dallas, TX (US)

( * ) Notice: Subject to any disclaimer, the term of this patent is extended or adjusted under 35 U.S.C. 154(b) by 0 days.

(21) Appl. No.: 19/039,743

(22) Filed: Jan. 28, 2025

Related U.S. Application Data

(60) Provisional application No. 63/733,572, filed on Dec. 13, 2024, provisional application No. 63/718,902, filed on Nov. 11, 2024, provisional application No. 63/548,703, filed on Feb. 1, 2024.

(51) Int. Cl.
  *G06Q 30/0241* (2023.01)
  *G06Q 30/0251* (2023.01)
  *G06T 11/00* (2006.01)
  *G10L 15/18* (2013.01)
  *G10L 15/183* (2013.01)
  *G10L 21/14* (2013.01)
  *G10L 25/18* (2013.01)

(52) U.S. Cl.
  CPC ..... *G06Q 30/0276* (2013.01); *G06Q 30/0269* (2013.01); *G06T 11/00* (2013.01); *G10L 15/1815* (2013.01); *G10L 15/183* (2013.01); *G10L 21/14* (2013.01); *G10L 25/18* (2013.01)

(58) Field of Classification Search
  CPC ........... G06Q 30/0276; G06Q 30/0269; G06T 11/00; G10L 15/1815; G10L 15/183; G10L 21/14; G10L 25/18
  USPC .......................................................... 704/257
  See application file for complete search history.

(56) References Cited

U.S. PATENT DOCUMENTS

| | | | | |
|---|---|---|---|---|
| 7,127,841 B1 * | 10/2006 | Weber | ..................... | G09F 27/00 40/124.03 |
| 7,142,645 B2 * | 11/2006 | Lowe | ..................... | G06F 16/40 379/88.16 |
| 7,213,259 B2 * | 5/2007 | Archibald | ........... | H04M 3/5307 379/67.1 |
| 7,292,681 B2 * | 11/2007 | Pines | ................... | B42D 15/022 379/88.07 |
| 8,244,544 B1 * | 8/2012 | LeBeau | ................... | G10L 15/26 704/235 |

(Continued)

*Primary Examiner* — Thuykhanh Le
(74) *Attorney, Agent, or Firm* — Perkins Coie LLP

(57) ABSTRACT

The present disclosure describes a customized voice messaging platform. The customized voice message placement can enhance engagement using personalized audio content. The platform can generate authentic-sounding voice messages using AI-driven processes, including text-to-speech (TTS) technology and audio concatenation, to create personalized audio content. The platform supports various delivery channels such as SMS, email, podcasts, and streaming services. The platform can incorporate visual elements like brand logos and animations into personalized messages. The platform can provide campaign creation functionality, enabling users to create campaigns deliver customized messages across multiple channels. The platform can provide message suggestions, automated testing, and other features. The platform can support rules for determining when to send messages and/or the content of messages.

20 Claims, 13 Drawing Sheets

(56) References Cited

U.S. PATENT DOCUMENTS

| | | | | |
|---|---|---|---|---|
| 8,295,804 | B2* | 10/2012 | Bosan | H04M 15/8221 455/406 |
| 8,855,334 | B1* | 10/2014 | Lavine | H04M 19/04 381/119 |
| 9,959,557 | B2* | 5/2018 | Bharath | G06Q 30/0271 |
| 10,706,845 | B1* | 7/2020 | Devaraj | G06F 3/0482 |
| 10,762,887 | B1* | 9/2020 | Tang | G10H 7/008 |
| 11,133,004 | B1* | 9/2021 | Naik | G10L 15/22 |
| 11,188,292 | B1* | 11/2021 | Jenkins | G10L 25/18 |
| 11,227,623 | B1* | 1/2022 | Vitt | G06F 3/017 |
| 11,947,871 | B1* | 4/2024 | Fisher-Stawinski | H04S 7/303 |
| 2002/0022999 | A1* | 2/2002 | Shuster | G06Q 30/0255 705/14.69 |
| 2003/0033206 | A1* | 2/2003 | Moshe | G07F 17/26 705/26.1 |
| 2005/0182675 | A1* | 8/2005 | Huettner | H04L 69/329 705/14.66 |
| 2006/0136556 | A1* | 6/2006 | Stevens | H04L 65/1101 707/E17.101 |
| 2006/0161850 | A1* | 7/2006 | Seaberg | G06F 40/186 715/744 |
| 2007/0150351 | A1* | 6/2007 | Libman | G06Q 20/102 705/14.67 |
| 2007/0208945 | A1* | 9/2007 | Edwards | G06Q 30/0272 713/176 |
| 2009/0276215 | A1* | 11/2009 | Hager | G06F 16/31 704/235 |
| 2009/0281794 | A1* | 11/2009 | Ben-Haroush | G10L 13/00 704/201 |
| 2010/0333134 | A1* | 12/2010 | Mudd | G06Q 30/02 705/14.66 |
| 2011/0219940 | A1* | 9/2011 | Jiang | G10H 1/366 84/622 |
| 2012/0090028 | A1* | 4/2012 | Lapsley | H04L 63/1416 704/E21.001 |
| 2013/0301392 | A1* | 11/2013 | Zhao | G06Q 20/3272 367/137 |
| 2015/0079947 | A1* | 3/2015 | Evgey | G06F 16/686 455/413 |
| 2015/0093955 | A1* | 4/2015 | Curry, Sr. | A63G 19/00 446/29 |
| 2015/0199968 | A1* | 7/2015 | Singhal | H04N 21/8405 704/251 |
| 2015/0248270 | A1* | 9/2015 | Lang | G16H 20/70 707/821 |
| 2015/0348554 | A1* | 12/2015 | Orr | G05B 15/02 |
| 2015/0379989 | A1* | 12/2015 | Balasubramanian | G06Q 30/0257 704/233 |
| 2016/0092935 | A1* | 3/2016 | Bradley | G06Q 30/0276 705/14.72 |
| 2017/0329776 | A1* | 11/2017 | Suleman | G06F 16/335 |
| 2020/0294365 | A1* | 9/2020 | Moskowitz | G07F 17/3288 |
| 2020/0302591 | A1* | 9/2020 | Parfitt | G06T 11/00 |
| 2021/0297374 | A1* | 9/2021 | Forster | G10L 13/00 |
| 2022/0075845 | A1* | 3/2022 | Bowen | G06F 30/30 |
| 2022/0138797 | A1* | 5/2022 | Wedel | G06Q 30/0261 705/14.5 |
| 2022/0191115 | A1* | 6/2022 | C S | H04L 43/103 |
| 2022/0191263 | A1* | 6/2022 | Pichaimurthy | G06V 20/46 |
| 2022/0246161 | A1* | 8/2022 | Verbeke | G06F 3/04847 |
| 2022/0301682 | A1* | 9/2022 | Balasubramaniam Krishnan | G16H 50/50 |
| 2023/0013539 | A1* | 1/2023 | Holland | G06F 3/1423 |
| 2023/0028693 | A1* | 1/2023 | Marzinzik | H04L 51/02 |
| 2023/0074406 | A1* | 3/2023 | Baeuml | G06F 16/90332 |
| 2023/0114350 | A1* | 4/2023 | Vahidi | G06Q 20/4014 705/44 |
| 2023/0141088 | A1* | 5/2023 | Giovagnoni | H04N 21/233 725/34 |
| 2023/0208977 | A1* | 6/2023 | Forster | H04L 51/10 455/413 |
| 2023/0267680 | A1* | 8/2023 | Lamour | G10L 13/02 345/419 |
| 2023/0274758 | A1* | 8/2023 | Markhasin | G10L 25/06 704/232 |
| 2023/0282025 | A1* | 9/2023 | Voss | H04N 21/84 382/118 |
| 2023/0377200 | A1* | 11/2023 | Klein | G06F 3/167 |
| 2024/0054517 | A1* | 2/2024 | Lendner | G06Q 50/01 |
| 2024/0078731 | A1* | 3/2024 | Beith | G06T 13/205 |
| 2024/0087737 | A1* | 3/2024 | Movva | G16H 40/67 |

* cited by examiner

CUSTOMIZABLE VOICE MESSAGING PLATFORM

RELATED APPLICATIONS

This application claims the benefit of priority to U.S. Provisional Application No. 63/548,703, filed Feb. 1, 2024, U.S. Provisional Application No. 63/718,902, filed Nov. 11, 2024, and U.S. Provisional Application No. 63/733,572, filed Dec. 13, 2024, each of which is hereby incorporated by reference as if set forth fully herein.

TECHNICAL FIELD

This disclosure generally relates to a customized messaging platform. Some implementations relate to generating customized voice messages. Some implementations relate to using artificial intelligence models for generating customized voice messages. In some implementations, customizations can be used to personalize messages for specific targets.

BACKGROUND

The approaches described in this section are approaches that could be pursued, but not necessarily approaches that have been previously conceived or pursued. Thus, unless otherwise indicated, it should not be assumed that any of the material described in this section qualifies as prior art. Marketing messages often come off as impersonal and are poorly targeted to individuals. For example, consumers may receive messages that are irrelevant to them, that advertise products they already have, and so forth. Generic marketing messages are often viewed by consumers as a nuisance.

Personalized marketing involves tailoring marketing messages, offers, and so forth to individual consumers based on their preferences, behaviors (e.g., past purchase history), demographics, and so forth. Customized messages can provide an improved consumer experience by targeting consumers with messages that are more relevant and engaging to consumers, potentially leading to greater satisfaction, improved conversion rates, and so forth. While significant effort and expense can be involved in creating more personalized marketing campaigns, such campaigns can have a higher return on investment, as consumers may be more likely to respond to messages that are better targeted.

However, there are significant limitations with current personalized marketing approaches. Personalized marketing can be fairly straightforward in certain context or using certain delivery methods, such as email. However, consumers may be less likely to respond to marketing messages that are provided in formats that consumers view as less engaging. Additionally, providing a high degree of personalization can become increasingly untenable as the target audience for marketing materials grows. Moreover, it can be a significant challenge to provide customized messages that are responsive to recent or current events, conditions, and so forth.

Accordingly, there is a need for systems and methods that can be used to generate customized marketing materials that consumers are more likely to engage with.

SUMMARY

For purposes of this summary, certain aspects, advantages, and novel features are described herein. It is to be understood that not necessarily all such advantages may be achieved in accordance with any particular embodiment. Thus, for example, those skilled in the art will recognize the disclosures herein may be embodied or carried out in a manner that achieves one or more advantages taught herein without necessarily achieving other advantages as may be taught or suggested herein.

In some embodiments, the techniques described herein relate to a computer-implemented method for generating a customized message for a target, the computer-implemented method including: accessing a script including one or more tokens; generating a request for a first user input of a first parameter value for a first parameter by a user; when the user provides the first user input of the first parameter value, assigning the first user input as the first parameter value of the first parameter; when the user does not provide the first user input of the first parameter value, assigning a default first parameter value as the first parameter value of the first parameter; generating a request for a first machine learning model to generate an audio template using at least the script and the first parameter value; providing the request to the first machine learning model, wherein providing the request to the first machine learning model causes generation of the audio template by the first machine learning model; accessing the audio template; identifying a timestamp of a token in the audio template; determining a duration of the token in the audio template; determining a token value for the target; generating a second request for a second machine learning model to generate an audio representation of the token value, wherein the second request includes at least the token value, an indication of a portion of the audio template preceding the token, and an indication of a portion of the audio template following the token; generating, using a second machine learning model, an audio representation of the token value; determining a length of the audio representation of the token value; adjusting a duration of the token in the audio template based on the length of the audio representation of the token value; inserting the audio representation of the token value into the audio template; generating a graphical representation based on a graphic information provided by the user, wherein the graphic information includes one or more of: a background color, a foreground color, a logo, or an image; generating the customized message using the audio representation and the graphical representation; and causing delivery of the customized message to the target via a first delivery channel.

In some embodiments, the techniques described herein relate to a computer-implemented method, further including, prior to generating the request for the first machine learning model: determining the first delivery channel; determining a message constraint based on the first delivery channel; and modifying the script such that the customized message complies with the message constraint, wherein the message constraint includes at least one of: a minimum message length, a maximum message length, a minimum file size, or a maximum file size, wherein modifying the script includes: generating a prompt for a large language model, wherein the prompt includes the script and the message constraint; and generating, using the large language model, a modified script that complies with the message constraint.

In some embodiments, the techniques described herein relate to a computer-implemented method, wherein the first parameter includes one of: a tone, a cadence, a sentiment, or a message length.

In some embodiments, the techniques described herein relate to a computer-implemented method for generating a customized message for a target, the computer-implemented method including: accessing a script including one or more tokens; generating a request for a first machine learning model to generate an audio template using at least the script; providing the request to the first machine learning model, wherein providing the request to the first machine learning model causes generation of the audio template by the first machine learning model; accessing the audio template; identifying a timestamp of a token in the audio template; determining a duration of the token in the audio template; determining a token value for the target; generating a second request for a second machine learning model to generate an audio representation of the token value, wherein the second request includes at least the token value, an indication of a portion of the audio template preceding the token, and an indication of a portion of the audio template following the token; generating, using a second machine learning model, an audio representation of the token value; determining a length of the audio representation of the token value; adjusting a duration of the token in the audio template based on the length of the audio representation of the token value; inserting the audio representation of the token value into the audio template to generate a final message audio; generating the customized message using the final message audio; and causing delivery of the customized message to the target via a first delivery channel.

In some embodiments, the techniques described herein relate to a computer-implemented method, further including: generating a graphical representation based on a graphic information provided by a user, wherein the graphic information includes one or more of: a background color, a foreground color, a logo, or an image, wherein the customized message includes the graphical representation.

In some embodiments, the techniques described herein relate to a computer-implemented method, further including: generating a request for a first user input of a first parameter value for a first parameter by a user; when the user provides the first user input of the first parameter value, assigning the first user input as the first parameter value of the first parameter; and when the user does not provide the first user input of the first parameter value, assigning a default first parameter value as the first parameter value of the first parameter, wherein the request for the first machine learning model to generate the audio template further includes the first parameter value.

In some embodiments, the techniques described herein relate to a computer-implemented method, wherein the request for the first machine learning model to generate the audio template further includes a parameter, wherein the parameter includes at least one of: a tone, a cadence, a sentiment, or a message length.

In some embodiments, the techniques described herein relate to a computer-implemented method, further including, prior to causing delivery of the customized message to the target via a first delivery channel: accessing consent information; and determining that the target consents to receiving the customized message based on the consent information.

In some embodiments, the techniques described herein relate to a computer-implemented method, wherein the token includes one of: a first name, a last name, a full name, a location, a current weather condition, a forecasted weather, a season, an event, a brand name, a product name, a product type, a price, a sale start date, a sale end date, a destination, an arrival date, a departure date, a holiday, a service name, a service type, or a birthday.

In some embodiments, the techniques described herein relate to a computer-implemented method, further including: determining a second token value for a second target; determining that the second token value has a same value as the token value; and causing delivery of the customized message to the second target via the first delivery channel.

In some embodiments, the techniques described herein relate to a computer-implemented method, further including: determining a delivery medium of the customized message; determining, based on the delivery medium of the customized message, a constraint on the customized message; and adjusting the customized message such that the customized message satisfies the constraint.

In some embodiments, the techniques described herein relate to a computer-implemented method, wherein the delivery medium is a multimedia messaging service (MMS) message, wherein adjusting the customized message includes causing the customized message to be deliverable as a single MMS segment.

In some embodiments, the techniques described herein relate to a computer-implemented method, further including, prior to causing delivery of the customized message: identifying a send condition; and determining that the send condition is satisfied.

In some embodiments, the techniques described herein relate to a computer-implemented method, wherein the send condition is based on one or more of a date, a time of day, an event, or a weather condition.

In some embodiments, the techniques described herein relate to a computer-implemented method, wherein the request for the first machine learning model to generate the audio template further includes a parameter, wherein the parameter includes a bit rate of the audio template.

In some embodiments, the techniques described herein relate to a method, wherein the graphical representation includes a spectrogram visualization of the final message audio.

In some embodiments, the techniques described herein relate to a computer-implemented method, further including: receiving a response from the target; determining a sentiment of the target based on the response; and generating a subsequent message, wherein a tone of the subsequent message is determined based at least in part on the sentiment of the target.

In some embodiments, the techniques described herein relate to a computer-implemented method for generating a customized message for a target, the computer-implemented method including: accessing an original audio recording, wherein the original audio recording includes a location for insertion of a token value, wherein the location includes a timestamp and a duration; providing the original audio recording to a machine learning model, wherein the machine learning model is configured to output a transcript of the original audio recording; identifying the location for insertion of the token value based on at least in part on the transcript; determining a token value for the target; generating a request for a second machine learning model to generate an audio representation of the token value, wherein the request includes at least the token value, an indication of a portion of the original audio recording preceding the location, and an indication of a portion of the original audio recording following the location; generating, using the second machine learning model, the audio representation of the token value; determining a length of the audio representation of the token value; generating a final audio content, wherein generating the final audio content includes inserting the audio representation of the token value into the original audio recording, wherein inserting includes increasing or decreasing the duration based on the length of the audio representation of the token value; generating the customized message based at least in part on the final audio content; and causing delivery of the customized message to the target.

In some embodiments, the techniques described herein relate to a computer-implemented method, further including: generating a graphical representation based on a graphic information provided by a user, wherein the graphic information includes one or more of: a background color, a foreground color, a logo, or an image, wherein the customized message includes the graphical representation.

In some embodiments, the techniques described herein relate to a computer-implemented method, wherein the graphical representation includes a spectrogram, wherein the spectrogram is generated by analyzing the final audio content.

All of the implementations described herein are intended to be within the scope of the present disclosure. These and other embodiments will be readily apparent to those skilled in the art from the following detailed description, having reference to the attached figures. The invention is not intended to be limited to any particular disclosed embodiment or embodiments.

BRIEF DESCRIPTION OF THE DRAWINGS

Detailed descriptions of implementations of the present invention will be described and explained through the use of the accompanying drawings.

Figure 1:
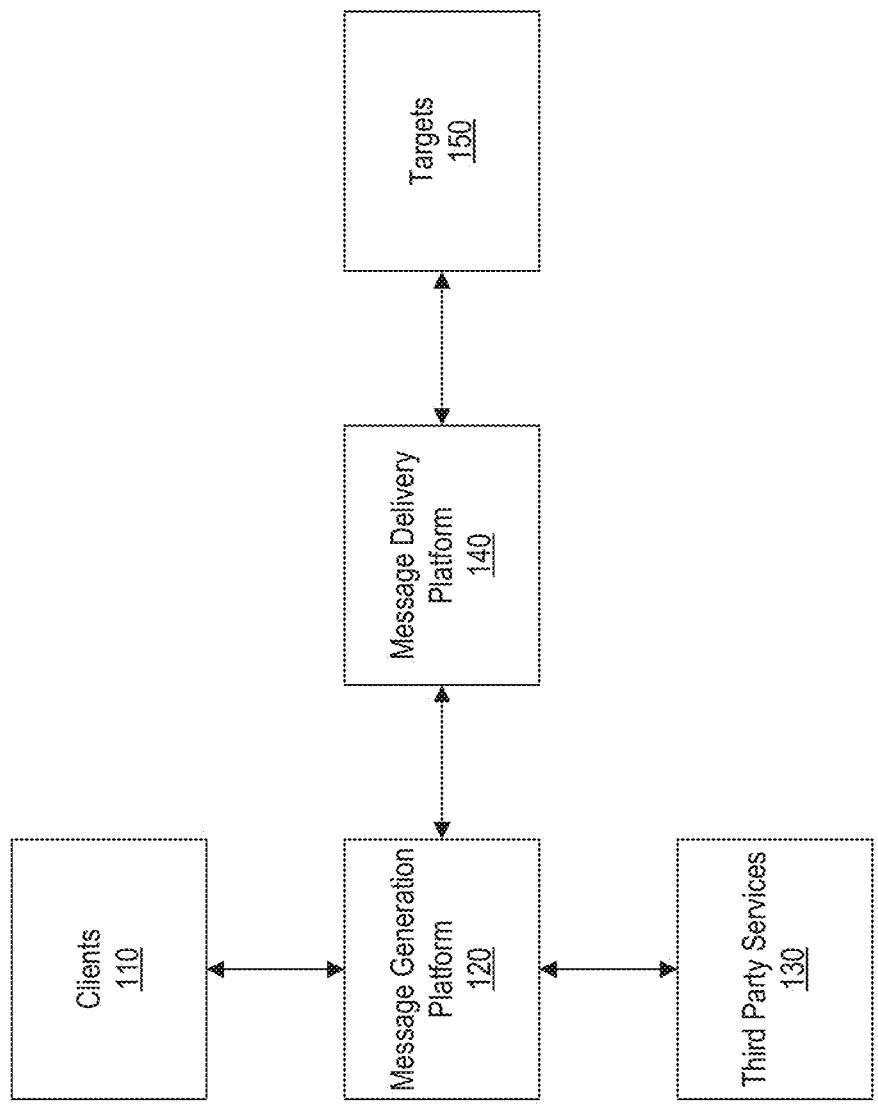
FIG. 1 is a block diagram that illustrates a message generation platform and interactions therewith according to some implementations.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Although several implementations, embodiments, examples, and illustrations are disclosed below, it will be understood by those of ordinary skill in the art that the inventions described herein extend beyond the specifically disclosed embodiments, examples, and illustrations and includes other uses and obvious modifications and equivalents thereof. Implementations of the inventions are described with reference to the accompanying figures, wherein like numerals refer to like elements throughout. The terminology used in the description presented herein is not intended to be interpreted in any limited or restrictive manner simply because it is being used in conjunction with a detailed description of certain specific implementations. In addition, implementations can comprise several novel features and no single feature is solely responsible for its desirable attributes or is essential to practicing the material disclosed herein.

INTRODUCTION

Conventional marketing and consumer outreach techniques rely on mediums such as text messages, calls, streaming ads, podcast ads, television ads, and emails. However, the content delivered via these mediums is often impersonal. Individuals may be less likely to engage with content that does not appear to be tailored to them or appropriate for current circumstances. Poor engagement rates can lead to time and money being wasted on marketing efforts that are of limited effectiveness. Potential customers may be less likely to engage with content they see as irrelevant to them, impersonal, repetitive, etc. For example, consumers may become annoyed at seeing the same advertisement over and over, may feel bombarded by materials from the same organization, or may be annoyed by or simply ignore advertisements for products or services they already have. Consumers may also be less likely to engage with marketing content that is poorly timed. As an example, marketing materials promoting winter wear may be less effective if sent on days when it is relatively warm outside, or advertisements for outdoor activities may be less successful if sent on rainy days or during a heat wave.

Voice messages can be a medium that provides an experience that feels more personalized than generic text messages or emails where the only customization is the insertion of someone's name. However, creating voice messages has long been a daunting task. Simply splicing together different pieces of audio, such as inserting pre-recorded names into another pre-recorded message, can often produce less than ideal results, as the splicing may be obvious due to changes in the voice itself, intonation, inflection, tone, cadence, and so forth. Historically, text to speech (TTS) systems have produced results that, while usable, are clearly not human and feel robotic and impersonal.

The approaches described herein can be utilized to create authentic-sounding voice messages that can improve consumer engagement. In some implementations, the approaches herein can include visual elements that can add to the personalization, reinforce brand awareness and recognition, and so forth. Visual elements can include, for example, brand logos, images of the speaker, color schemes, holiday, or other event-based themes, and so forth.

While voice messages may often be delivered in the form a text message (e.g., a multimedia messaging service (MMS) message), other delivery modes are also possible, such as via podcasts, streaming services (e.g., video streaming services, audio streaming services), email, and so forth. In some implementations, a platform as described herein can provide an end-to-end solution for creating and sending messages with customized/personalized audio content. In some implementations, users utilize the platform to generate customized audio content, but may perform other tasks, such as generation of messages for delivery, sending messages, etc., outside the platform. Additionally, while discussed largely in the context of personalizing audio content for particular targets (e.g., consumers), it will be appreciated that a platform according to the present disclosure can be used to generate audio content that is not necessarily customized for specific targets. For example, the platform of the present disclosure can be used to generate audio content that is customized based on product, region, language, weather, current event, and/or the like. That is, the customized voice messaging platform described herein can be used for a wide range of scenarios in which multiple versions of similar audio content are needed or beneficial, or in cases where audio content is needed for various scenarios (e.g., different audio content is needed for different weather conditions, different customer statuses, etc.). The customized voice messaging platform can be used in many different contexts, such as marketing, fundraising, support, emergency notifications, and so forth.

The customized voice messaging platform of the present disclosure can create and deliver audio campaigns to targets of a platform user (e.g., a business, non-profit, etc.). Unlike traditional text-based communication channels, the customized voice messaging platform of the present disclosure can leverage customized voice messages, visual elements, animations, etc., to enhance target engagement and retention.

The customized voice messaging platform can offer a range of features that can be beneficial for marketing campaigns or other outreach efforts. In some implementations, the platform provides campaign creation functionality. During campaign creation, users can initiate campaigns through an application (e.g., a web site, web application, mobile application, desktop application, etc.) by providing certain inputs such as a list of recipients (e.g., as a text file, spreadsheet, etc., or by providing access to a data store such as a customer relationship management (CRM) database), preferred delivery channel(s) (e.g., SMS, RCS, voicemail, podcast ad, e-mail, push notification, social media platform, etc.), personalizable text content, personalizable voice content, style configurations for graphics/animations, etc. In some implementations, a user can select multiple channels through which customized content is to be delivered. For example, some targets may receive podcast ads while others may receive text messages, or the same target may receive customized content through more than one delivery channel.

In some implementations, the platform enables customized audio generation. With customized audio generation, an AI-driven process can utilize audio concatenation, text-to-speech (TTS) technology, or both to generate customized audio content. The platform can address mispronunciation issues by analyzing keywords in a pronunciation library and replacing them with phonetic alternatives. In some implementations, the pronunciation library includes information useful for pronouncing consumer names, product names, brand names, etc.

In some implementations, the platform can be used to create graphics (which can be static or animated). The platform can use customized audio to generate a visual animation using sound level data analysis (e.g., to generate a spectrogram). In some implementations, the platform generates Scalable Vector Graphics (SVGs), which can be utilized to provide graphics that accompany an audio message. In some implementations, a graphic can be an animated graphic that has a visual appearance resembling an "audio player" component, for example showing one or more features such as a spectrogram, play button, time count, etc. This is merely an example, and it will be appreciated that many different static graphics, animated graphics, or both can be generated in a variety of file formats, styles, and so forth.

The platform can include a wide range of features to optimize customized messaging. Such features are described in greater detail herein. By way of illustration and not limitation, several example use cases are described below, relating to the usage of customized messaging in online retail, hospitality, streaming services, fitness services, retail chains, and meal kit delivery services. These examples indicate ways in which various features of the platform can be used to provide customized messages to consumers.

An online retailer can use the platform to enable customized target engagement through audio messages delivered via SMS, email, podcast, streaming service, messaging app, social media platform, or any other channel or combination of channels. The platform can integrate with the retailer's customer data platform (e.g., through secure API connections) to gather customer data which can include, for example, purchase history, location, demographics, any other customer data, or any combination thereof. The customer data can be structured into dynamic tokens that can be inserted into audio scripts. The platform can apply logic rules (e.g., processed through a hierarchical decision tree) to create targeted messages. The logic rules can include nested conditions, fallback options, etc. Real-time weather data can be integrated to provide contextual messaging. An LLM that is part of or integrated with the platform can analyze past purchase data, engagement data, etc., to predict interests for new customers through lookalike audience modeling. The platform can vary messages and can continuously improve messaging through automated A/B testing, analyzing metrics such as click-through rates and conversions to select and scale the best-performing message variants.

As another example, in the hospitality sector, hotel chains can deliver customized audio updates throughout the guest journey. The platform can integrate with the hotel's customer relationship management (CRM) system to collect booking details, stay history, amenity preferences, etc. The platform can convert this information into dynamic tokens. The platform can maintain brand consistency by analyzing past marketing materials, guest communications, etc., to ensure a particular type of presentation, such as using a formal, welcoming tone. Logic rules can be used to manage conditional messaging based on room type, guest status, etc. For example, logic rules can personalize tailored messages so that premium services are offered to people in higher end rooms (e.g., "if {roomType}='suite' then promote premium services"). In some implementations, real-time weather data can enable contextual recommendations for activities, amenities, etc. For example, if it is sunny and warm in a location, a customized message can be, "It's sunny in {location}- enjoy poolside service!"}. In some implementations, an LLM is used to analyze previous stays, amenity usage patterns, etc., to create customized content for repeat guests. In some implementations, the platform uses lookalike modeling for first-time visitors, for example comparing a new target to existing targets based on what information is known or inferred about the new target. Message effectiveness can be continuously refined through A/B testing of different tones, lengths, etc., across various communication channels.

As still another example, for streaming services, the platform can enable delivery of customized audio advertisements based on listener demographics, location, time of day, etc. In some implementations, the platform collects and tokenizes listener data from the streaming platform's database, maintaining each advertiser's brand voice through analysis of existing content. Advanced logic rules can enable time-sensitive promotions and flexible ad adjustments, while location data can enable targeted local promotions. The LLM (or another machine learning model, such as a clustering model) can create lookalike audiences to predict listener interests and deliver relevant ad content, even when direct user data is limited. In some implementations, the platform continuously optimizes ad performance through A/B testing of different scripts, tones, calls-to-action, etc.

As another example, a fitness app can utilize a platform as described herein to deliver motivational audio content, personalized workout recommendations, and so forth. The platform can integrate with the app's backend to collect exercise preferences, activity levels, user goals, and so forth. The platform can convert this information into customizable tokens. In some implementations, the platform is configured to maintain a motivating and supportive tone while employing logic rules that adapt messages based on user engagement patterns. Weather data integration can enable contextual outdoor workout suggestions, while the LLM component can provide personalized workout tips and motivational messages based on user history, behavior patterns, etc. Message effectiveness can be continuously refined through testing of different tones, content lengths, messaging frequencies, and so forth.

For retail chains, the platform can deliver location-based promotional audio messages considering factors such as customer proximity and purchase history. The system can integrate with the retailer's CRM to process loyalty tier information, recent purchases, location data (e.g., which store or stores a particular customer frequents), and so forth. Brand consistency can be maintained through analysis of public-facing materials to capture a friendly, urgency-driven tone. The platform can utilize conditional rules to prioritize offers based on loyalty status, while incorporating store-specific hours and weather data for local context. An LLM can use lookalike modeling to identify and target high-value customers or to identify groups of customers who would likely be more responsive to deep discounts, with continuous optimization through A/B testing of different messaging approaches.

A meal kit delivery service can utilize customized messaging to provide various information to consumers, such as personalized delivery updates, meal recommendations, recipe recommendations, discounts, and so forth. The platform can integrate with the service's CRM to process dietary preferences, order history, loyalty status, and so forth. The platform can maintain a friendly, customer-centered tone while employing hierarchical rules to adjust content based on order patterns, dietary preferences, and so forth. Real-time weather data can enable seasonal recipe recommendations, while the LLM can use lookalike audience data to provide relevant suggestions for new customers. The platform can continuously optimize message effectiveness through testing of recipe suggestions and message tones, using engagement metrics to refine the LLM's predictive accuracy.

The above examples are merely illustrative of some possible uses of the platform described herein. It will be appreciated that the platform described herein can be utilized for many different messaging purposes and with varying degrees of customization, rules, etc. For example, one platform user may only want to generate messages with consumer names included in the messages, while another may want to highly target customers and customize messages based on purchase history, usage patterns, viewing history, weather conditions, location information, income information, and so forth. As described in more detail herein, users can utilize the platform for simple messaging, and the user interfaces and backend design described herein can enable users to easily create highly complex, highly customized campaigns.

The above examples illustrate some of the various features that can be included in the platform. It will be appreciated that, depending upon the specific implementation and use case, different features, combinations of features, etc., may be provided to and/or used by users of the platform. For example, some messaging campaigns may be highly customized or utilize complex triggering rules associated therewith, while other campaigns may utilize relatively simple personalization, such as including a customer's name in the message, inserting a current sale price, etc.

In some implementations, audio templates can include tokens. Tokens can represent places within an audio template where token values can be inserted. Tokens can include, for example, customer name, product name, brand name, current weather conditions, future weather conditions, event information (e.g., the name of an artist performing in the area, the teams playing in an upcoming match, etc.), pricing information, or any other information that a user may want to customize.

There can be various types of tokens. For example, there can be internal tokens, external ecommerce order tokens, external ecommerce subscriber tokens, and so forth. Examples of internal tokens include, for example and without limitation, consumer phone number, consumer email, consumer first name, consumer last name, etc. Examples of external ecommerce order tokens can include, for example and without limitation, order ID, order app ID, order cancel reason, order cancelation date, order cart token, order checkout token, order closed date, order confirmed, order created date, order currency, order subtotal price, order total discounts, order total price, order total tax, order financial status, order fulfillment status, order location ID, order name, order number, order status URL, order processed date, order checkout ID, order source name, order tags, order token, order total weight, or order updated date. Example of external ecommerce customer tokens can include, for example and without limitation, customer ID, customer accepts marketing, customer marketing consent state, customer marketing consent opt in level, customer marketing consent updated date, customer created date, customer city, customer company, customer country code, customer country name, customer province, customer state, customer email, customer first name, customer last name, customer phone, customer last order ID, customer last order name, customer orders count, customer status state, customer tags, customer tax exempt, customer total spent, customer updated date, customer verified email. In some implementations, custom tokens can be used. Custom tokens can have custom attribute names and custom attribute values.

Target Data Integration

As described herein, delivering customized content can be important for the success of marketing campaigns and other outreach efforts. Accordingly, it can be significant for a customized messaging platform to have access to information about targets (e.g., customers, prospects, donors, etc.) (generally referred to herein as targets, customers, or consumers for brevity and ease of reading). In some implementations, the platform interfaces with one or more external systems, such as customer data platforms (CDPs), customer relationship management systems (CRMs), e-commerce systems, etc. These integrations can enable the ingestion of customer data that can be used to personalize audio content. Such information is not limited to customer names but can include, additionally or alternatively, demographic information such as age or gender, location information, purchase history, donation history, income, household size, and so forth.

In some implementations, a platform accesses data from one or more external platforms, databases, etc. The platform can access external data using a variety of approaches known to those of skill in the art. For example, in some implementations, the platform accesses external data using one or more of REST APIs or webhooks. In some implementations, the platform accesses data in real-time or nearly real time (e.g., the platform accesses data from external sources substantially as the external sources are updated with new or changed data). In some implementations, the platform accesses external data periodically, such as hourly, daily, weekly, monthly, etc. In some implementations, the platform accesses external data as it is needed. For example, a platform can access external data when a user triggers execution of a new campaign. In some implementations, the platform utilizes asynchronous data processing, for example to handle large volumes of incoming data. In some implementations, the platform utilizes synchronous data processes, such that data is processed as it is received or accessed. In some implementations, each incoming data element is tagged or otherwise identified with or associated with a specific target profile. In some implementations, each incoming data element is stored as one or more structured attributes. In some implementations, the platform builds profiles of targets based on accessed information from external sources, information supplied by users of the platform, and/or information supplied by the targets themselves (e.g., when a target replies to a message sent via the platform).

In some implementations, ingested data is parsed and structured into attributes, such as {firstName}, {purchaseHistory}, {productCategory}, etc. In some implementations, customer attributes are mapped to speech tokens using a token generation algorithm. For example, {firstName} can be converted to a placeholder token, which can be dynamically replaced during the creation of customized audio content. This can enable efficient, large-scale personalization of audio scripts without the need for manual editing.

It will be appreciated that there can be large amounts of customer data that is ingested by a platform. Accordingly, in some implementations, the platform utilizes distributed computing techniques to balance data processing loads across multiple computing systems. In some implementations, the platform uses a data query language such as GraphQL, which can be used to fetch data from multiple sources.

Script and Tokenized Campaign Generation

Campaigns can generally include a script. The script can be a textual representation of what is to be in an audio message. In some implementations, a user provides a script, and the platform generates audio from the script. For example, the platform can generate an audio template. The audio template can include tokens. The platform can determine values to be inserted for the tokens and can generate audio for the values. These different pieces of audio can be assembled into a final audio message. In some implementations, the final audio message is included in a final message package, such as a text message (which can be, for example, an MMS message or RCS message), instant message (e.g., WhatsApp message, WeChat message, etc.), social media message, email, etc.

In some implementations, a platform as described herein can be configured to enable users to input text scripts and/or upload pre-recorded audio (also referred to herein as original audio) to serve as the base for customized audio campaigns. Users can insert tokens into scripts, identifying places within scripts that can be replaced by the platform with target-specific data, such as name, location, destination, current weather in or near target's location or destination, and so forth, product-specific data such as product names, or any other information. Users can define tokens for a wide range of attributes, such as names, products, purchase histories, and so forth. The attributes are not necessarily limited. In some implementations, the platform enables users to save a result as a tokenized campaign template.

In some implementations, the platform provides a web interface (or other user interfaces, such as a mobile application, desktop application, etc.). A user can utilize the web interface to submit a script to the platform. The platform can parse the script and identify locations where tokens are to be inserted. The platform can prompt users to map such tokens to available customer attributes (which may be specific to a particular customer, or may be broader, such as relating to a region) or any other information, such as product listings.

In some implementations, the platform includes a database (e.g., a relational database) or utilizes an external database to manage tokens. Tokens can be linked to customer attributes. In some implementations, when a campaign is launched, the platform retrieves the correct attribute for each customer and inserts it into a tokenized script.

As described herein, scripts can be text-based or audio-based. In the case of a text-based script, the platform can utilize a text-to-speech (TTS) engine to convert the text-based script into an audio file. If a user submits a pre-recorded audio file (also referred to herein as original audio), the platform can process the audio file and identify where tokens are to be inserted. In some implementations, a user indicates token locations. For example, the platform can use a speech to text model to generate a transcript of the original audio, and the user can indicate where tokens should be inserted. The platform can use an audio processing model capable of splitting and/or splicing audio at token points without causing audible discontinuities.

In some implementations, the platform stores templates in a repository. Users can access the repository to reuse certain content across multiple campaigns. For example, a previous script can be recycled and updated to apply new tokens, to change certain non-tokenized information, etc. This can help ensure consistency across different marketing efforts. Such functionality can reduce the effort required to build subsequent campaigns.

In some implementations, the platform can be optimized for rapid data retrieval, enabling tokens to be dynamically inserted into a template immediately or shortly before distribution. Thus, in some implementations, the platform enables rapid deployment of marketing campaigns. This can be of particular significance for time-sensitive campaigns, such as marketing campaigns that are triggered or customized in relation to weather events, breaking news, etc., for which there may be little or no advance notice.

As described herein, customer data, product data, other data, or any combination thereof can be transformed into tokens, inserted into templates, used to generate customized audio, and so forth.

In some implementations, a user inputs data indicating which tokens are to be placed where within a script. The platform can access customer data (or any other data, such as product data, donor data, etc.) and determine token values based on user definitions, system-provided definitions, or both. For example {firstName} can be mapped to a target's first name in a database. Tokens can be stored in a database (e.g., a relational database) or other data store and mapped to consumer attributes/token values. For example, the platform can store a mapping that maps {firstName} to a database table field such as donors.firstname, where the name of the table is donors and the name of the field is firstName. In some implementations, tokens are mapped in other ways. For example, a token can be mapped to an API call for retrieving the token value from a system such as a CRM system. Users can embed tokens in scripts, (e.g., "Hello {firstName}, thanks for your recent purchase of {productCategory}."). The tokens in a script can be placeholders that are dynamically replaced with values when a campaign is launched or a customized message is generated. In some implementations, the values can be accessed in real-time or nearly real-time. In some implementations, tokens or placeholder values are included in generated audio templates or original audio templates as described herein. In some implementations, placeholder values may not be included.

Messaging campaigns can be ended in a variety of ways. For example, campaigns can be time-limited, goal-oriented, etc. For example, a campaign can end after a specified date or duration. In some implementations, a campaign is terminated based on one or more key performance indicators, such as revenue targets, engagement metrics, etc. In some implementations, a campaign terminates once all members of the target audience have been messaged. In some implementations, users can specify a budget for a campaign, and the campaign can end once the budget is reached. In some implementations, a campaign can end based on an external trigger. For example, if a campaign was triggered by rain, the campaign can end once the weather clears.

Brand Identity Definition and Content Intent

When building a marketing campaign, it can be important to ensure that the campaign conforms to brand guidelines, has the appropriate tone, the desired intent, and so forth. In some implementations, the platform is configured to scrape or otherwise access information such as public-facing marketing materials, social media posts, past emails, other marketing campaigns, and so forth. In some implementations, the platform accesses brand guidelines, which may be publicly accessible, uploaded to the platform, or otherwise made accessible to the platform.

The platform can parse such information to build a profile of a brand's tone, style, voice, and so forth. For example, the platform can determine if the brand presents itself as formal, casual, sophisticated, approachable, young, and so forth. The profile can be used by the platform to maintain or improve consistency across campaigns. The platform can determine other information about the brand, such as general sentiment (e.g., positive, negative, neutral), pacing, and so forth. The platform can categorize this information and store the results in the brand's profile. The categorization can help ensure that the brand's communication style is maintained across campaigns, marketing channels, and so forth.

In some implementations, users can specify an intent for a campaign. The intent can be, for example, promotional (e.g., when promoting a new product, sale, event, etc.) or educational (e.g., when providing information about how to use a product or service to someone who has already made a purchase). The platform can cross-reference the intent with the brand profile to ensure that the content achieves the desired intent while remaining aligned with the brand's identity and overall communication style. This can enable a more effective and targeted communication strategy, improving target reception.

In some implementations, the platform generates suggested scripts or revises scripts provided by a user. For example, the platform can utilize a large language model (LLM), the brand profile, and the intent (if provided) to generate suggested scripts or to modify a submitted script. In some implementations, the platform utilizes information from past successful campaigns, learned language patterns, current marketing best practices, etc., to offer suggestions that fit the brand's identity and the intent of the campaign. This can help streamline the content creation process and ensure high quality scripts are used in campaigns.

In some implementations, the platform enables users to override suggestions from models and to manually adjust content according to brand preferences or stylistic choices. This flexibility enables users to fine-tune content to better match specific requirements or preferences. In some implementations, the platform utilizes the revisions for model tuning so that future runs generate content (e.g., scripts) that is more closely aligned with the brand's current style, voice, tone, etc.

In some implementations, users can indicate that old learnings or brand profile information should be discarded. For example, companies and other organizations may on occasion rebrand, changing logos, style, and so forth. Thus, older content may no longer be representative of the brand. Accordingly, it can be beneficial to provide functionality that allows users to indicate that a brand profile should be rebuilt based on newer materials.

Personalization Rules

As described herein, in some cases, a user may want to generate messages with relatively simple customizations, such as adding in a customer name or product name. In other cases, a user may want to generate messages that are more highly customized, for example based on location, weather, age, past interactions, past purchases, and so forth. In some implementations, the platform includes a rules engine that can be used to craft customized messages. For example, the rules engine can select a script or be used in generating a script based on various information (e.g., location, gender, weather, age, income, purchase history, stay history, workout history, dietary preferences, etc.). In some implementations, rules can utilize inferred preferences for decided which message to send or whether or not a message should be sent.

Some non-limiting examples of rules include:
If {age}>50 Then use Voice A (where Voice A has a more mature tone);
If {purchaseHistory} includes {electronics} Then insert Phrase A (e.g., "We've got new deals on electronics for you!");

If {timeOfDay}='morning' Then insert "Good Morning, [firstName]";

If {weather}='rainy' Then Insert "Looks like it's rainy in [location], how about some indoor shopping at the mall!"; and If {weather}='rainy' and {timeOfDay}='evening' Then Insert "It's wet out. Let us deliver dinner to you."

As shown in the examples above, rule statements can check a value of a variable or multiple variables and can select statements to include in a message based on the values of those variables.

In some implementations, rules can be used to determine whether or not to send a message. For example, a rule can be "If {purchaseHistory} includes 'Mason 1500' Then Stop" so that a user who has already purchased the product ("Mason 1500") does not receive a message promoting a product they already own. As another example, a rule can be based on past interactions with a consumer. For example, "If {previousInteractionSentiment}='upset' Then use Voice B" where Voice B is a calmer, more reserved voice than another voice. In some implementations, a natural language processing model, such as BERT or VADER, is used to determine the sentiment of the target.

As described herein, in some implementations, the platform integrates environmental data. The environmental data can be obtained from a third party source, for example as described herein by using an API, web hook, scraping, etc. Other data can be considered additionally or alternatively, such as time of day, device type (e.g., mobile, desktop, iOS™, Android™, Windows™, macOS™), and so forth. Such information can be used to customize a message or to decide whether or not to send a message. For example, there may be little benefit in marketing an accessory for an Android device to a user who is using an iOS device.

In some implementations, rules can be nested. That is, multiple conditions can be layered. In some implementations, the platform includes conflict resolution functionality. For example, in the case that two rules might apply, the platform can be configured to select which rule to apply based on predefined user preferences. In some implementations, the platform implements a fallback hierarchy in which the platform can automatically determine which rule to apply based on a highest relevance score. In some implementations, relevance scores are based on specificity. For example, more specific rules can be preferred over less specific rules. For example "If {weather}='rain' and {timeofday}='morning'" can take precedence over "if {weather}='rain'." Aside from priority tags (e.g., user-defined preferences) or granularity, relevance scores can be based, additionally or alternatively, on recency, user interaction history, historical effectiveness, contextual relevance, user demographics or preferences, frequency of overlaps, rule complexity, external data confidence, temporal relevance, behavioral data, and so forth. For example, more recently created or modified rules can take precedence over older rules, rules that frequently lead to desired outcomes (e.g., higher engagement rates) can take precedence over rules that lead to desired outcomes less frequently, more effective rules (e.g., based on conversion rates, click-through rates, etc.) can take precedence, or more contextually relevant (e.g., based on location, time, season, etc.) can take precedence. For example, a rule relevant during the holiday season might be prioritized in December. If rules are targeted to specific audience segments, relevance scores can be weighted based on demographics, preferences, etc., of the audience segments. If multiple rules overlap, the platform can assign higher relevance scores to rules that align with a larger subset of overlapping conditions. For example, a rule that overlaps with two other rules might take precedence over a rule that overlaps with only one rule, though the opposite may be desirable in some circumstances and depending upon the particular rules in question. In some implementations, users may specify that they prefer simpler rules with fewer conditions, although in other cases users may indicate that they prefer more complex, specific rules. In some implementations, relevance scores can reflect a confidence level in external data sources used in the rule. For example, if a weather API returns correct information 90% of time while another API returns correct information 60% of the time, rules that utilize information obtained via the weather API can be assigned a higher relevance score. In some implementations, rules are scored based on how far into the future or past their conditions apply. For example, in the context of a weather-based condition, "if {weather}='rain' in the next hour" may have a higher score than "if {weather}='rain' in the next 24 hours." In some implementations, rules incorporate behavioral data (e.g., real-time or nearly real-time behavioral data), such as whether a target has previously responded favorably to similar triggers.

In some cases, there may be failures when constructing a message. For example, certain data may be missing, corrupted, etc. In some implementations, a platform utilizes fallback rules, error detection, other mechanisms, or any combination thereof to address errors, failures, missing data, and so forth.

In some implementations, a platform can utilize fallback logic when specific data is unavailable. For example, if a template includes a token for first name, but that value is missing, a default value or message can be used. As an example, a fallback rule can be "if {firstName} is missing, Use "Hi There" (e.g., instead of "Hi, {firstName}"). In some implementations, the platform performs data validation checks to identify missing or corrupted data before message generation. In some implementations, when there is an error, the platform can attempt to mitigate the issue. For example, for external data sources, an API call can be retried or an alternative API endpoint can be used. In some cases, the platform may fall back to another data provider (e.g., in the case of widely available data such as weather data which may be available from multiple sources). In some implementations, rules can define alternative flows when data is missing or corrupted, such as omitting specific tokens or skipping a message altogether. In some implementations, failures are logged for further analysis. In some implementations, flagged messages are held for manual review. In some implementations, flagged messages are automatically reprocessed, which may resolve the error (e.g., in the case that an external data source was temporarily unavailable). In some implementations, testing using dummy data can help to identify potential gaps in a message generation process, such as unhandled failures or missing data.

Preferences Inference

A significant issue with customized messaging is the cold start problem, in which little or nothing is known about a target prior to reaching out to the target. For example, there may be a rich set of data for existing customers, such as past purchases, bookings, income levels, demographics, and so forth. However, for a new customer or prospect, relatively little may be known. This can make it difficult to personalize messages.

In some implementations, the platform can infer preferences by using a machine learning model to predict target preferences. In some implementations, the platform uses a partitioning method (e.g., k-means clustering), density-based method (e.g., density-based spatial clustering of applications without noise (DBSCAN)), hierarchical method (e.g., agglomerative hierarchical clustering), Gaussian mixture model (GMM), expectation maximization (EM) model, grid-based method, fuzzy clustering, spectral clustering, constraint-based clustering, etc.

Individuals can be clustered based on various criteria, such as age range, gender, gender identity, sexual orientation, income level, location, type of community the individuals live in (e.g., rural, suburban, or urban), purchase history, engagement data, interaction frequency, content preferences, device usage, family status, and so forth. It will be appreciated that only limited information may be known about certain individuals, such as prospective customers. In some implementations, the platform can attempt to infer certain information based on what information is known. For example, if an individual's first name is known, the platform can, in many cases, infer a likely gender for the individual. If an individual's zip code is known, it may be possible to determine their likely income range, likely age range, etc.

In some implementations, the platform can identify or determine a plurality of lookalike audiences. The lookalike audiences can be, for example, clusters resulting from application of an algorithm such as a k-means clustering algorithm or other clustering algorithm. In some implementations, lookalike modeling can be performed using a predictive model such as logistic regression or gradient boosting (e.g., XGBoost, LightGBM) to identify similarities between new targets and existing target clusters.

The platform can assign new targets to lookalike audiences based on similarities between the new targets and existing lookalike audiences. In some implementations, the platform customizes content based on the new target's similarity to a subset of lookalike audiences, such as lookalike audiences representing high value customer segments.

In some implementations, the platform utilizes a predictive model for first-time targets (and/or for targets for which little past history is available). The platform can assign targets to a lookalike audience based on what information is available, and generate customized content based on the lookalike audience to which they are matched. The platform can automatically adjust an audio message to align with the preferences and behaviors of the most similar audience segment (e.g., the most similar lookalike audience), which can improve the relevancy of the messages and make new targets more likely to engage with the content. Such tailoring can extend beyond just audio and can include, additionally or alternatively, variations in the frequency of messaging, times at which messages are sent, colors used in generated visual content, etc. As an example, if available information indicates that someone does not celebrate Christmas, a customized message may use usual brand visuals instead of holiday-specific visuals that are delivered to other consumers. Based at least in part on the lookalike audience, the platform can adjust content variables such as tone, product recommendations, call to action style (e.g., urgent or not), and so forth.

In some implementations, the platform is configured to utilize a recommendation system to predict preferences, to recommend content, or both. For example, content can be recommended based on purchase history, engagement history, or any other factor or combination of factors. In some embodiments, collaborative or content-based filtering models/techniques are used, such as matrix factorization (e.g., via alternating least square (ALS)) or term frequency-inverse document frequency (TF-IDF).

In some implementations, the platform is configured to monitor performance within lookalike audiences. This information can be fed back into the predictive model to retrain or tune the model to improve future predictions. In some implementations, the predictive model utilizes continuous learning. In some implementations, the predictive model is retrained periodically or on occasion.

Continuous Improvement

As individuals interact with customized content, the platform can collect performance metrics, such as listen rates, click-through rates, conversion rates, and so forth. Different delivery methods may provide for different performance metrics. For example, SMS or MMS messages do not provide read receipts; however, RCS messages can provide read receipts. Thus, in some cases read receipts can be used as a performance metric, while in other cases, read receipts are not used. Other delivery methods may enable different ways to verify if a message has been viewed by an individual or may provide no method for determining if the recipient actually viewed the message. For example, email messages can include a tracking pixel or similar feature that can be used to determine if a message has been viewed. Links can be customized so that they are specific to a particular target, specific to a target segment, etc.

In some implementations, the platform can monitor interactions with campaigns and collect data about consumer behaviors. For example, the platform can utilize information such as whether a user accessed a message, finished listening to a message, clicked a link in a call to action, etc. In some implementations, the platform accesses information from third parties (e.g., a company that is running a campaign), such as sales data, bookings data, etc. Such data can be fed into the platform (e.g., into one or more machine learning models utilized by the platform) to improve future campaigns, personalization strategies, etc.

In some implementations, the platform (e.g., one or more backend components of the platform) collects information from any or all of various sources, such as email platforms, SMS platforms, website analytics, customer relationship management tools, etc. The platform can include an analytics engine that analyzes data such as listening completion rates, clickthrough rates, conversion rates, etc. This information can be used to evaluate campaigns and identify campaigns that are more effective, less effective, etc. Such information can be used to modify existing campaigns, to aid in developing new campaigns, and so forth.

In some implementations, the platform collects feedback from user interactions with the platform. For example, in some implementations, some or all consumers can be provided with a choice of which message they would like to listen to. Such information can enable the platform to better tailor future script suggestions, better personalize content, etc. In some implementations, users are not provided with choices, but different customized messages are delivered to different targets, and feedback data is collected to identify which of the different customized messages are most effective. As described herein, it will be appreciated that different segments of targets (e.g., different lookalike audiences) may respond differently to different customized messages. Thus, different messages can be selected for different target segments.

In some implementations, the platform includes an optimization algorithm. The optimization algorithm can be a machine learning model that is trained to identify patterns in successful campaigns, in less successful campaigns, or both.

For example, the optimization algorithm can be used to identify which tones, phrases, delivery methods, etc., generate the highest engagement, for the entire target audience and/or for specific target segments. In some implementations, the results of the optimization algorithm are used to adjust scripts, logic rules, campaign templates, etc., for future campaigns. In some cases, the platform can suggest adjustments to the current campaign, for example when a campaign is taking place over several days or weeks. In some implementations, the platform automatically adjusts an ongoing campaign based on received feedback, performance data, etc.

In some implementations, one or more machine learning models of the platform are continuously, periodically, and/or on-demand retrained with performance data, target feedback, user feedback, or any combination thereof. This can enable the platform to improve the relevance and effectiveness of future campaigns without manual analysis and tweaking by users. Over time, the platform can refine its personalization strategy to better suit the needs and preferences of users and targets.

Automated Message Testing and Optimization

As described herein, targets may respond differently to different messages, for example to different tones, message lengths, speakers, and so forth. One advantage of the platform described herein is that it can be used to quickly and easily generate multiple variations of audio content. In some implementations, the platform provides functionality for testing of different messages. For example, in some implementations, the platform selects a subset of targets for testing and processes received feedback (e.g., listen completion rates, call to action engagement rates, conversion rates, etc.).

Different target segments may respond differently to message variants. For example, an upbeat message in the voice of a famous pop artist may appeal strongly to a younger demographic but perform very poorly with an older audience comprised largely of people who are not fans of, and perhaps do not even recognize, the famous pop artist. The older audience may respond more strongly to an artist from their youth or to an authoritative figure.

In some implementations, users can specify different parameters for messages for different target audience segments. For example, the platform can modify generated audio or original audio to speed it up or slow it down. For example, younger professionals in a major city may prefer faster messages, while an older or more rural target may prefer that messages be delivered with a slower cadence. In some implementations, automated testing can help users identify what types of messages work best for different target audiences or target audience segments.

In some implementations, the platform described herein is configured to provide automated testing (e.g., A/B testing) that can enable users to experiment with different message variants. Users can select which variables to test, such as tone, message length, or speaker, and the platform can automatically generate multiple message variants. In some implementations, the platform, additionally or alternatively, automatically selects variables to test. The message variants can have slight or large differences in tone, length, phrasing, etc. In some implementations, the variants are distributed randomly across a sample selected from the target audience. As variants are distributed, the platform can track performance data, such as completion rates, engagements (e.g., target clicked a link in a call to action), conversion rates (e.g., target made a purchase), etc. The platform can identify the best version or versions and distribute the best version or versions across the target audience. In some implementations, such testing can be carried out for specific target segments, and messages can be selected for each target segment.

In some implementations, the platform stores information about the best variant(s) and uses this information when creating future campaigns. For example, a user can upload a script, and the platform can compare the script to previous successful campaigns and suggest changes to the script that may make it more similar to scripts used in successful campaigns.

In some implementations, testing continues even after a campaign is released to a target audience. For example, multiple variants can be selected for distribution to the target audience, and the platform can automatically select one or more variants preferentially for delivery to targets based on observed performance data during the campaign. This can be especially beneficial when campaigns are rolled out over time, as opposed to messaging every target in the target audience simultaneously or substantially simultaneously (e.g., within minutes or hours), as a longer campaign allows for sufficient data to be collected to make decisions about which variant(s) to send while there is still a substantial number of targets in the target audience who have not received the message.

Channel-Specific Messaging

As described herein, customized messages can be distributed through various channels, such as text messages, e-mails, messaging platforms (e.g., WeChat, WhatsApp), social media platforms (e.g., Facebook, Instagram, Bluesky), podcasts, streaming services, and so forth. Different delivery methods and platforms can have different capabilities, limitations, requirements, and so forth. Different platforms can, additionally or alternatively, have different norms. It can be significant to tailor messages for different distribution channels. This tailoring can include varying content length, style, formatting, and so forth.

In some implementations, strict rules, general guidelines, or both can be used when tailoring messages for particular channels. For example, a set of rules could be:

Text Message: Short-form audio (e.g., <=15 seconds) with concise messaging;

Email: Longer-form audio (e.g., 30-60 seconds) with more detailed content;

Podcast Ad: Medium-long audio (e.g., 30-90 seconds) with conversational tone; or.

Push Notification: Short, attention-grabbing content (e.g., <=10 seconds).

In some implementations, rules are used to enhance a prompt for a machine learning model (e.g., an LLM) to instruct the machine learning model to generate outputs that meet certain constraints or guidelines.

In some implementations, the platform automatically converts audio or generates audio in an appropriate format (e.g., MP3, WAV, etc.) that complies with relevant rules (e.g., time constraints) of a selected distribution channel.

In some implementations, the platform is configured to optimize messages based on delivery channel, which can help improve engagement and effectiveness of each channel. In some implementations, the platform automatically adjusts the delivery style (e.g., tone, pacing) to match a content format of a selected channel. For example, content delivered via push notification can have a fast-paced, urgent tone, while content delivered via email can have a slower, more conversational tone.

The platform can enable cross-channel consistency. For example, despite changes in format, length, etc., the content can remain consistent (though possibly not identical) across channels.

In some implementations, the platform customizes messages to conform to specific requirements of different channels. For example, a social media platform may require that graphical assets have a certain aspect ratio, that audio be in a particular format, that video be in a particular format, that images be in a particular format, that images do not exceed a certain size, that video does not exceed a certain size or length, etc. In some implementations, the platform maintains a knowledge base of such rules and customizes assets based on the rules. In some implementations, users upload different assets that comply with different rules, and specific assets are selected based at least in part on the channel.

In some implementations, a user provides a base audio recording or text script (generally, a "base script"). The base script can include tokens for customized content, such as name, location, purchase history, etc., which can be replaced automatically during a message customization process, for example as described herein. The user can provide a selection of one or more distribution channels for the campaign, such as SMS, MMS, RCS, email, push notification, podcast ad, streaming service ad, social media ad, etc. Each channel can have different requirements or limitations, such as limitations on audio length, format specifications, etc. Additionally, different tones may be more or less appropriate for different channels.

The platform can automatically adjust the length, style, tone, and so forth of the base script based on the channels through which generated customized messages will be delivered. In some implementations, the platform automatically optimizes audio based on the distribution channel. For example, for SMS and push notifications, audio content can be optimized for fast delivery and small file sizes. For example, content may be formatted as an MP3 with a fairly low bitrate. An email message may use a higher quality format such as WAV or higher bitrate MP3. Podcast or streaming ads may be longer and use a higher quality format such as WAV or higher bitrate MP3.

In some implementations, the platform applies adjustments based on channel requirements or limitations, customer engagement data, etc. For example, if the platform determines that consumers respond better to casual tones in email campaigns but prefer formal tones in SMS, the platform can adjust the content accordingly. In some implementations, environmental data such as time of day, weather, etc., are used to further optimize the tone, timing, etc., of delivery for specific channels.

The platform can provide consistent content across channels, while such content is nonetheless adapted to each channel. For example, consider a campaign distributed via SMS and email. Consumers who receive an email can be provided the same overall content as consumers who receive an SMS message, although there may be adjustments in length, tone, format, etc.

Such channel-based customization can be carried out in various ways. For example, in some implementations, users provide a script to the platform, and the platform utilizes a machine learning model (e.g., an LLM) to provide variations of the script for different channels. For example, if a user provides a long script, the LLM can be instructed to generate a shorter version of the script for use in text messages. In some implementations, users provide key information, instructions, and/or the like, and the platform generates scripts for different channels using the LLM. For example, a user can upload a list of bullet points about a sale (e.g., what items are on sale, how much the markdown is, when the sale starts, when the sale ends, etc.), and the platform can generate one or more scripts for one or more channels using the LLM. In some implementations, the user provides information such as tone, cadence, visual styling, etc. In other cases, the platform can use information it has about the brand (e.g., from past campaigns, from web scraping, etc.) to generate scripts that fit with a brand's overall style. For example, as described herein, in some implementations, the platform builds a brand profile based on various information about the brand, such as emails, social media posts, marketing materials, brand guidelines, blog posts, etc.

Responsive Messaging

In some implementations, the platform delivers content to targets but does not respond to messages received from targets in a contextually aware manner (or, in some implementations, at all). For example, if a target responds to a text message, the platform may not process the response or may not provide a substantive response to the feedback. That is, the platform may facilitate one-way communications that flow from companies, organizations, etc., to targets.

In some implementations, the platform can utilize two-way communication. Thus, for example, a company can send a marketing message to a target and receive a response from the target. The response can be used for various purposes. For example, a response can be used in determining a subsequent message to send to the target. For example, if a promotional message is for a sale, a target might ask when the sale ends, and the platform can respond with the date that the sale ends. As another example, if a target asks for more information, the platform can direct the target to a support agent who can help answer their questions.

In some implementations, the platform is configured to receive communication from targets in various ways. For example, a consumer may send a text-based reply to a text message, email, instant message, direct message, etc., and the platform can process the text-based reply (e.g., using an LLM) to understand the content, tone, etc., of the reply. In some implementations, the target can respond via voice, and the platform can utilize a speech to text model to transcribe the voice message. The transcription can be provided to an LLM to extract information from the voice message. In some implementations, audio, text, or both are analyzed using a natural language processing model to determine sentiment. For example, in some implementations, a natural language model such as BERT or VADER is used to understand feedback or engagement sentiment.

Responsive messaging can utilize actual responses from targets. In some implementations, the platform, additionally or alternatively, makes inferences based on information about clicks, purchases, completions (e.g., whether a target finished listening to a message), etc., and customizes future messages based on those inferences.

Quality and Regulatory Compliance

The platform described herein provides various features and includes various design decisions that help facilitate compliance with the TCPA or other regulations. Some features can improve accessibility.

Artificial intelligence and machine learning models can enable the generation of customized messages at scale. However, there are significant risks associated with delivering content that was created using generative models. For example, generative models typically lack understanding of what they are generating and may hallucinate, generating content that is factually incorrect, nonsensical, poorly phrased, or that sounds inauthentic. Hallucinations and other issues with generative models can lead to the dissemination of incorrect or offensive information, which can make messages less effective, damage a brand's reputation, result in financial harm, and so forth. Another consideration is that text-to-speech models may struggle with pronunciation, intonation, and so forth, leading to messages that are difficult to understand, have odd or off-putting delivery, and so forth. Mispronunciations or inappropriate tone may make messages seem disrespectful or impersonal or may cause recipients to fail to understand what the message is about. When a generative model is used to create or modify scripts, they may produce offensive, biased, or otherwise inappropriate scripts, for example due to biases in training data used to train the model.

Advantageously, the platform described herein can mitigate these and other issues in various ways. For example, an audio template or set of audio templates can be generated, and a user can verify the content, tone, pronunciation, etc., in the template(s) to ensure that the template(s) are satisfactory. Customized messages can then be generated from the audio template, in which specific tokens are substituted for values, such as locations, names, weather conditions, etc. Substitutions can be carried out using a model that is provided with information, such as a pronunciation library, which can help it produce correct outputs. The pronunciation library can include information about how specific terms, names, and so forth should be pronounced. Thus, rather than generating entire messages for each customized message to be sent, only portions of a template are replaced, thereby reducing the chances of erroneous or otherwise problematic material being included in the customized message.

In some implementations, the platform includes functionality to aid in verifying that messages are appropriate for delivery to targets. For example, unless the number of targets is very small, it may be impractical for a human to listen to and manually verify every variant of a message. Depending upon how many tokens are included in a message, the size of the target audience, and so forth, the number of different messages may be very large. In some implementations, the platform utilizes one or more signal processing algorithms to identify potentially problematic generated messages. For example, signal processing techniques can include pitch detection, spectral analysis, or formant analysis methods. Such methods can be used alone or in any combination. Such methods can be used to detect changes in pitch, prosody, tone, timbre, voice quality, etc., which may indicate a problem with generated speech, such as a poor quality or inappropriate tone. Potentially problematic messages can be flagged for review before being delivered to targets. In some implementations, messages identified by the platform as potentially problematic are automatically re-generated.

In some implementations, the platform uses machine learning to identify potentially problematic messages. For example, a machine learning model can be trained to identify and/or classify changes in vocal characteristics. For example, a platform can extract features such as Mel-Frequency Cepstral Coefficients (MFCCs), chroma features, spectral contrast, etc. A machine learning model such as a support vector machine, random forest, or neural network can be trained on labeled datasets to identify different tones, pitches, emotional states, sentiments, etc., in a message. In some implementations, deep learning models, such as convolutional neural networks or recurrent neural networks, are used to analyze messages and detect subtle changes in vocal characteristics. Using spectral processing, machine learning, or both, messages that may be problematic due to incorrect tone, incorrect pitch, poor voice quality, etc., can be detected before delivery to recipients.

In some implementations, the platform is configured to analyze scripts to identify potential problems. For example, the platform can scan a script to identify certain words in the script that may warrant attention, such as potentially offensive terms or long words that are more likely to be mispronounced. In some implementations, users can provide a list of forbidden words to the platform, which can be used to identify potential problems in generated scripts. In some implementations, such a list can be provided to a generative model (e.g., to an LLM), and the generative model can be instructed (e.g., via prompt engineering) to avoid use of the terms in the list.

Different countries, regions, etc., have various regulatory requirements for delivering marketing messages to consumers. For example, in the United States, the Telephone Consumer Protection Act (TCPA) imposes certain requirements on marketing messages. For example, to deliver marketing messages that are compliant with the TCPA, the sender must obtain express prior written consent, the message must provide a clear way to opt out, the message must clearly identify the sender, the content must not be misleading, messages may only be sent within certain hours (unless the recipient has provided consent otherwise), senders must comply with applicable National Do Not Call (DNC) registry rules, and so forth. Senders who fail to comply with these requirements can face significant penalties.

The platform described herein provides various features and includes various design decisions that help facilitate compliance with the TCPA or other regulations. For example, messages can include visual elements that identify the sender, links to unsubscribe from messages, etc. In some implementations, the formatting or packaging of the message can have implications for compliance with regulatory requirements.

One challenge associated with messaging is that certain messaging methods, such as MMS, have limitations on file sizes, message length, etc. In some implementations, the platform is configured to restrict content length to ensure that a customized message and a textual component (e.g., an unsubscribe link or instruction) are delivered as a single message. When a message exceeds a size limit, it may be broken up into multiple message segments and each individual message segment can be delivered to a target. However, this poses a potential problem as delivery may succeed for one part of a message but not for another part. Thus, a target may receive a marketing message but not receive instructions for opting out. Thus, it can be advantageous to ensure that all content is delivered as a single message to ensure that so long as the recipient receives the marketing message, they also receive information required for regulatory compliance. In some implementations, the platform automatically produces variants of a script in order to meet size and/or time length limitations.

While delivering content in audio form can provide a more personal experience to consumers, it can also present accessibility challenges. For example, consumers who are deaf or hard of hearing may prefer a message that they can read instead of listening to. In some implementations, messages sent by the platform include a link so that a recipient can access a text-based version of the message. In some implementations, recipients can opt out of receiving such links. In some implementations, such links are included only occasionally or with a first message unless a consumer who receives the message opts in to receiving links to text-based messages. In some implementations, a consumer can indicate that they only want to receive text-based messages, in which case customized text can be generated by the platform, but personalized audio messages are not generated for the target.

Example Implementations

FIG. 1 is a block diagram that illustrates a message generation platform and interactions therewith according to some implementations. As shown in FIG. 1, clients 110 can interact with message generation platform 120. The clients 110 can submit information for generating messages, such as branding information (e.g., colors, images, logos, etc.), scripts, recorded audio, and so forth. In some implementations, the message generation platform 120 generates messages without the aid of third party services, but in some implementations, the message generation platform 120 utilizes one or more third party services 130 for certain parts of the message generation process, such as for performing text-to-speech operations, audio substitutions, and so forth. The message generation platform 120 can interact with a message delivery platform 140 to facilitate delivery of messages to targets 150. The message delivery platform 140 can be, for example, a service that enables sending of text messages to targets 150. In some implementations, the message delivery platform 140 is a platform such as a social media platform, chat platform, or email platform that enables delivery of messages to targets 150. In some implementations, message delivery functionality is implemented within the message generation platform 120, and thus message delivery platform 140 may not necessarily be used or may be a component of the message generation platform 120.

Figure 2:
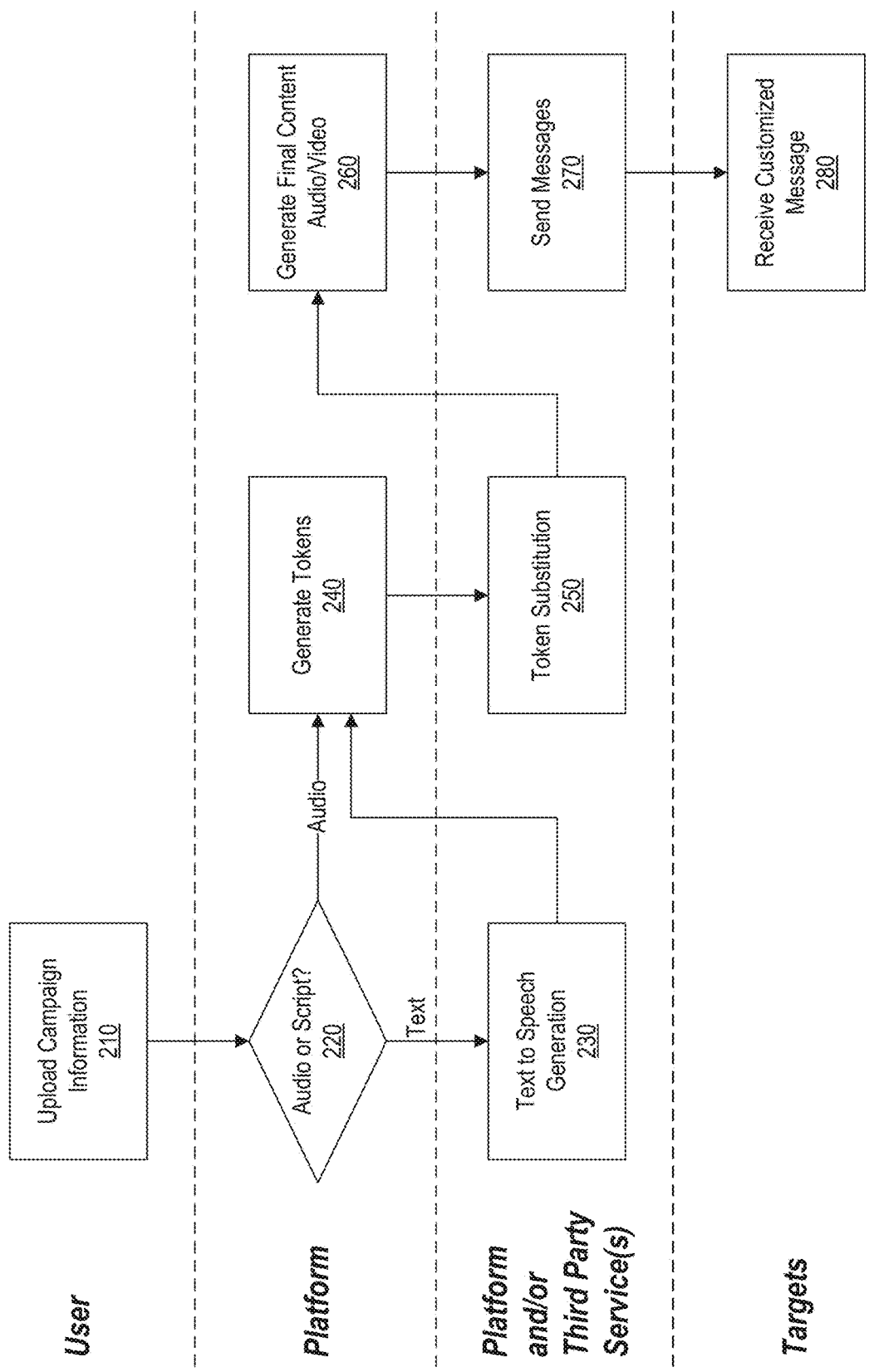
FIG. 2 is a flowchart that illustrates an example process for message generation and delivery according to some implementations.

FIG. 2 is a flowchart that illustrates an example process for message generation and delivery according to some implementations. At operation 210, a user can upload campaign information. The campaign information can include instructions, assets, and so forth for generating customized messages. The campaign information can include images, color schemes, scripts, audio, other information for generating messages, or any combination thereof. In some implementations, the instructions include information such as delivery dates/times for when messages should be sent, names of recipients, contact information for recipients (e.g., phone number, e-mail address, social media username), etc. At operation 220, the platform can determine if the uploaded campaign information includes audio (e.g., an audio file) or a script (e.g., a text-based script). If the content is text-based, the platform can utilize a text-to-speech service for TTS generation at operation 230. As described herein, in some implementations, the platform itself performs TTS operations without the use of a third party service. If the content is audio, TTS can be skipped. At operation 240, the platform can generate tokens, in which portions of the audio (either generated at operation 230 or supplied by the user) as identified as places where values are to be substituted (e.g., the name of the person to whom a message is targeted, the name of a product being marketed, etc.) At operation 250, a third party service (or the platform in some implementations) can perform token substitution, in which portions of audio are inserted into the user-supplied or the generated audio content. For example, audio might say "Hi, {FIRST NAME}, we wanted to let you know that {PRODUCT} is launching on {LAUNCH DATE}. Visit us online or in store to get yours!" and the token substitution can fill in {FIRST NAME}, {PRODUCT}, and {LAUNCH DATE} to produce audio content. As an example, after token substitution, a message might say, "Hi, David, we wanted to let you know that our new fall sneakers are launched on Thursday. Visit us online or in store to get yours!" It will be appreciated that an audio template may not literally include {FIRST NAME} or other tokens. For example, an audio template may only include static audio segments, and the platform can store timestamps for where token values should be inserted into the audio template.

As described herein, the token substitution process can be optimized by not generating audio for every recipient. For example, if two recipients have the same first name, there is no reason to generate the same message twice if first name is the only token. Rather, the same customized message can be used for both individuals who have the same first name (in the case where first name is customized for the recipient but the message would otherwise be unchanged). At operation 260, the platform can generate final content, which can be audio content or audiovisual content. Approaches for generating final content are described in more detail herein, but generally can include applying customized branding, generating visualizations, and so forth. At operation 270, the messages can be delivered using one or more third party services. In some implementations, the platform itself is configured to facilitate message delivery without the use of third party services. At operation 280, recipients can receive the customized messages.

Figure 3:
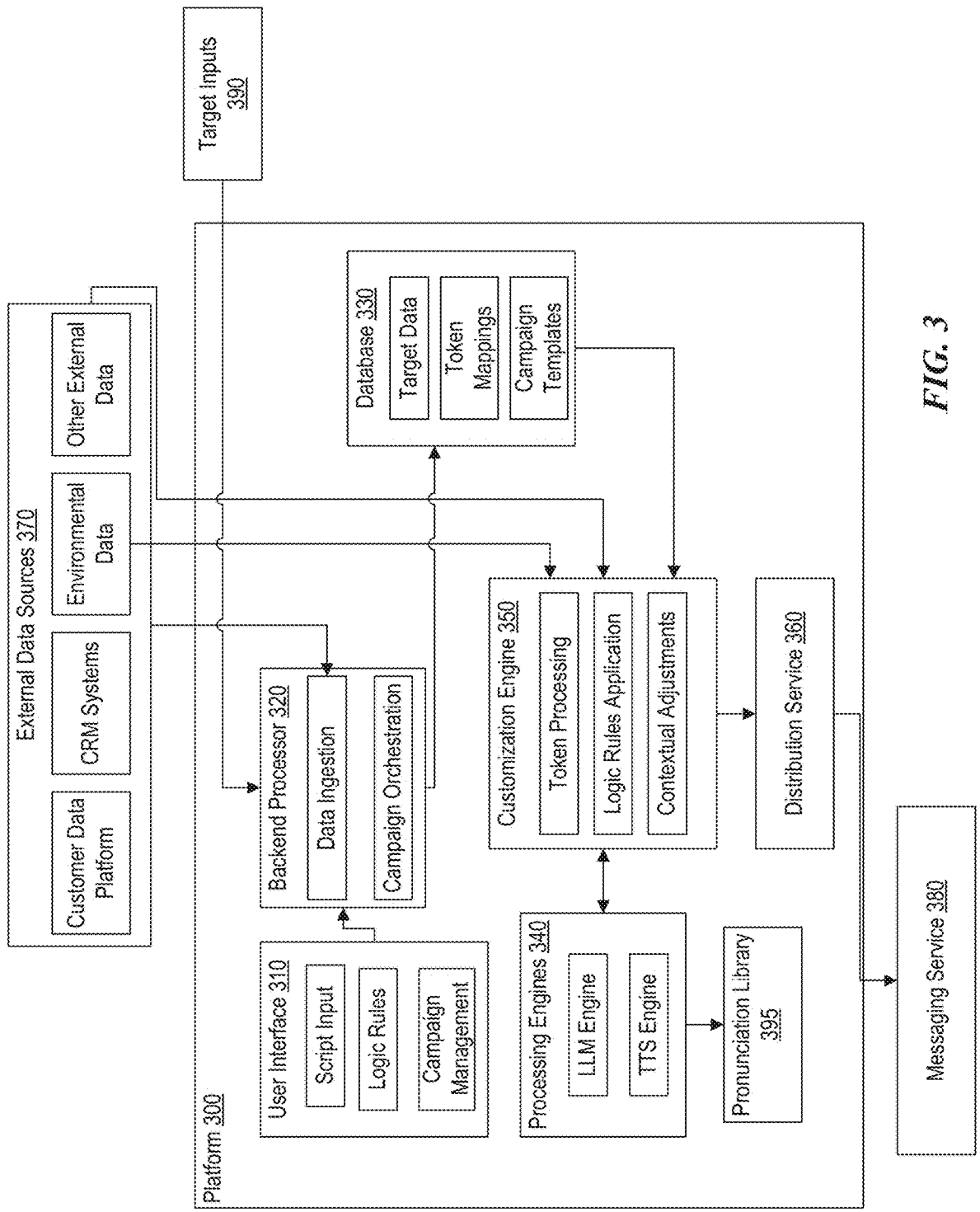
FIG. 3 is a block diagram that schematically illustrates various components that can be included in a customized voice message platform as described herein.

FIG. 3 is a block diagram that schematically illustrates various components that can be included in a customized voice message platform as described herein. It will be appreciated that the platform illustrated in FIG. 3 is merely an example, and other configurations, which may include more features or components, fewer features or components, and/or different features or components, are also within scope of this disclosure. Moreover, it will be appreciated that different components can be combined, split, or otherwise modified, while still being within the scope of this disclosure. A platform 300 can access data from external data sources 370. The external data sources 370 can include, for example, customer data platforms, CRM systems, environmental data (e.g., weather data), and/or any other external data. The platform 300 can receive target inputs 390. The target inputs 390 can include, for example, text-based responses from targets, images received from targets, audio messages received from targets, and so forth. In some implementations, the platform 300 communicates with a messaging service 380. The messaging service 380 can be a third party messaging service, for example a text messaging service, email delivery service, etc. In some implementations, the platform 300 includes a messaging service. An included messaging service can be in addition to an external messaging service or can be an alternative to an external messaging service. For example, in some implementations, the platform 300 includes functionality for delivering messages via certain channels (e.g., social media direct messages) but relies on an external messaging service for other channels (e.g., text messages).

The platform 300 can include various components, such as a user interface 310, backend processor 320, data 330, processing engines 340, customization engine 350, and distribution service 360, and pronunciation library 395. The user interface 310 can be provided as a web application, web page, mobile application, desktop application, etc. The user interface 310 can include functionality for inputting scripts, defining logic rules, managing campaigns, and so forth. In some implementations, the user interface 310 enables users to upload original audio to be used in campaigns. The backend processor 320 can include functionality for ingesting data (e.g., as provided by users via the user interface 310, from external data sources 370, etc.), orchestrating campaigns (e.g., causing messages to be sent, determining when conditions are met, etc.), and so forth. The backend processor 320 can store data in data 330. The data 330 can store various information such as target data, token mappings, campaign templates (e.g., scripts, original audio, rules, visual assets, etc.), and so forth. The processing engines 340 can include various features. For example, the processing engines 340 can include an LLM engine that can be used to generate new scripts or customize existing scripts. The processing engines 340 can include a text-to-speech engine for generating speech from a text input, and so forth. In some implementations, the processing engines 340 are not part of the platform 300. That is, for example, the processing engines 340 can be external services that the platform 300 communicates with to accomplish tasks such as generating or customizing scripts, generating audio templates, generating final audio content for messages, and so forth. The platform can utilize the target inputs 390 to aid in generating audio with the correct pronunciations. The customization engine 350 can apply logic rules, contextual adjustments (e.g., based on weather, current events, etc.), and process tokens to replace tokens with specific token values for different targets. The distribution service 360 can communicate with messaging service 380 to facilitate delivery of generated messages. In some implementations, the customization engine 350, distribution service 360, or another component of the platform 300 generates a final message based on generated audio, generated graphical elements (e.g., video generated using uploaded graphics or user-selected colors), etc.

Figure 4A:
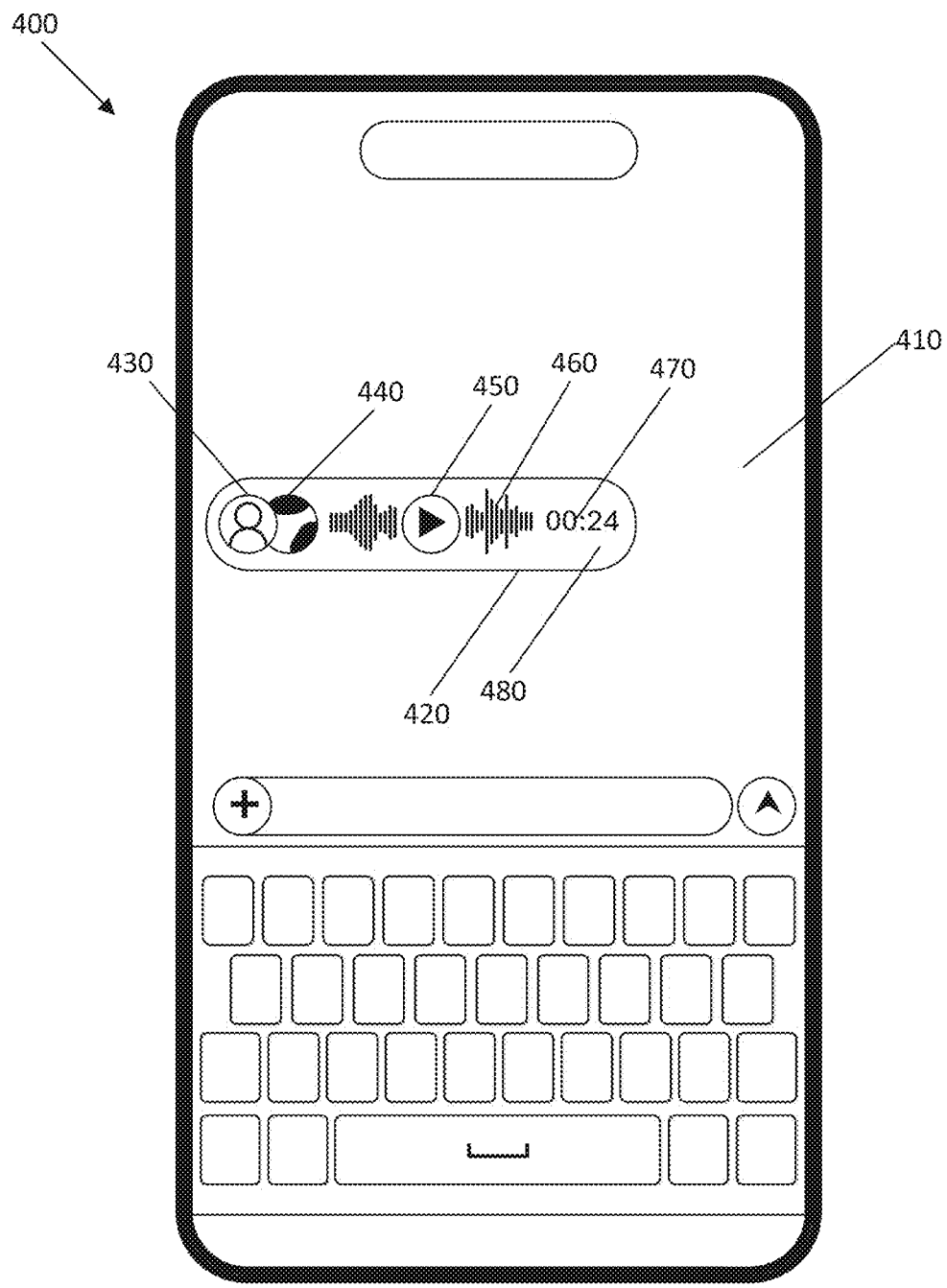
FIGS. 4A and 4B are drawings that show an example customized audio message according to some implementations.

FIG. 4A is a drawing that shows an example customized audio message according to some implementations. As described herein, the customized audio message can be delivered as part of a generated video. The video can be formatted such that its appearance is similar to standard audio messages, although this is not necessary. The video can utilize various brand features or other visual indicators that can help to identify the source of the message, foster user engagement with the message and/or the brand, and so forth. In FIG. 4A, a user device 400 includes a display 410. Within a messaging application of the user device 400, a user can view a message 420. In the example, of FIG. 4A, the message 420 is a video, although other delivery payloads are possible, such as audio-only messages. The message 420 can include various elements such as an image 430. The image 430 can be, for example, an image of the individual who voiced the message. The message 420 can include a second image 440. The second image 440 can include, for example, a brand logo, event logo, etc. The message 420 can include a play button 450. The play button 450 may not serve a particular function (and indeed may be a static visual element) but can make the message appear more like a conventional media player interface. In some implementations, the play button 450 may not be present. For example, if a platform provides a separate user interface element for playing media (e.g., audio and/or video) messages, including a play button in the message payload may only confuse recipients. In some implementations, the message 420 includes a visualizer 460. As described herein, the visualizer 460 can be generated by analyzing an audio message. In some implementations, the message 420 includes a counter 470. The counter 470 can indicate, for example, how far along a user is in a message, how much time has elapsed since the user began playing the message, or how much time remains in the message. In some implementations, a background 480 of the message 420 can be branded. For example, the background 480 can be set to a color that matches a brand's color scheme. In some implementations, the background 480 is static. In some implementations, the background 480 is dynamic. For example, rather than a single color, the background 480 can have multiple colors, can be animated, etc. This is merely an example, and customized messages can be created in a wide range of visual appearances and including a wide range of visual elements.

Figure 4B:
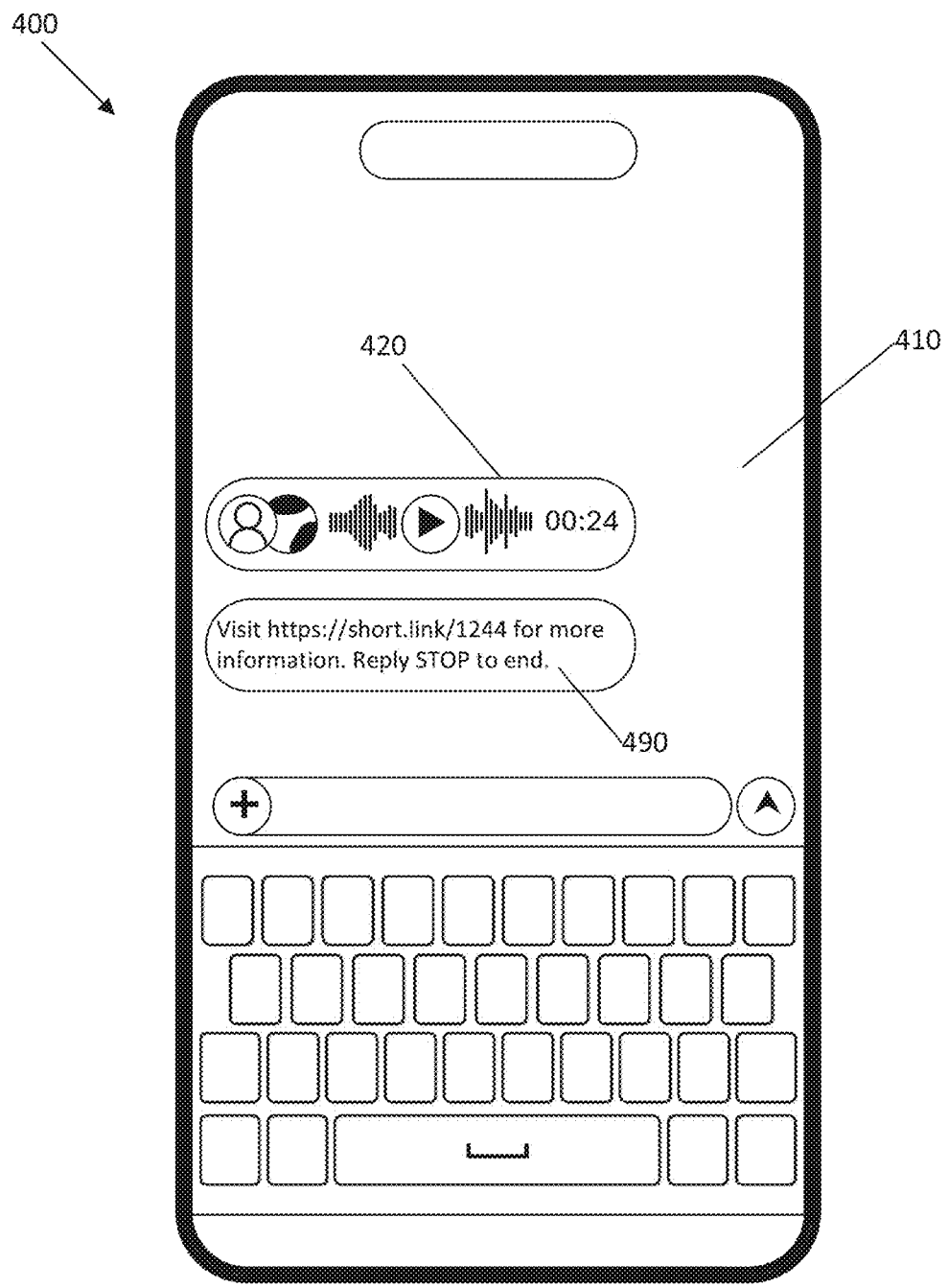

FIG. 4B is generally similar to FIG. 4A. In FIG. 4B, a message 490 is included in addition to the message 420. The message 490 can be, for example, a standard text message, although other implementations are possible. The message 490 can include a call to action (e.g., a link for the user to click to learn more, a phone number to call, etc.). In some implementations. The message 490 includes instructions for users to stop receiving messages from the sender.

Figure 5:
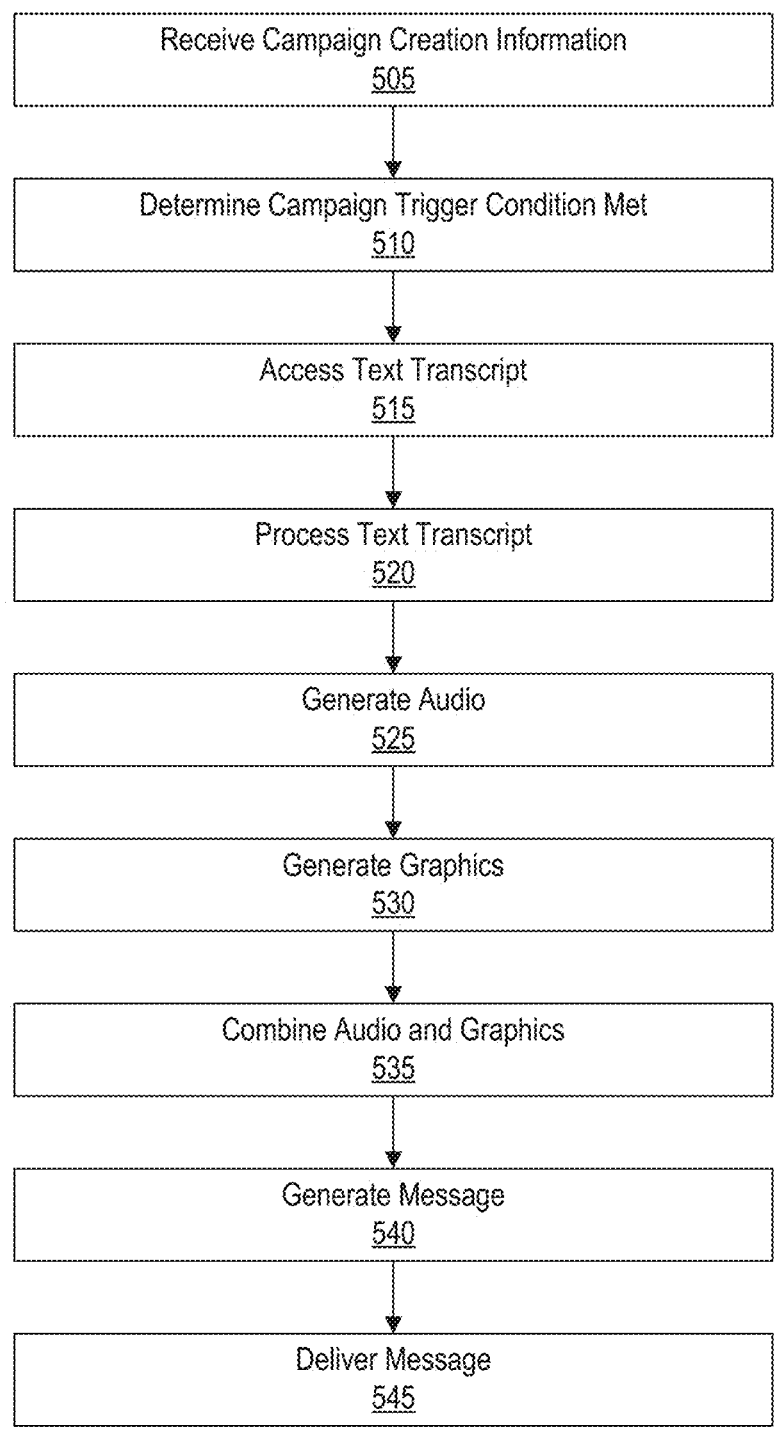
FIG. 5 is a flowchart that illustrates an example process for generating and delivering customized messages according to some implementations.

FIG. 5 is a flowchart that illustrates an example process for generating and delivering customized messages according to some implementations. At operation 505, a platform can receive campaign creation information. The campaign creation information can include, for example, a script, original audio, visual assets, target list (e.g., a list of phone numbers and names), rules, conditions for triggering the campaign, etc. At operation 510, the platform can determine that one or more campaign trigger conditions have been met. For example, the platform can receive a request to trigger a campaign and/or can determine that a campaign should be launched based on a condition being satisfied, such as a date, weather condition, etc. Some examples of conditions or events that may trigger a campaign include manual triggering, weather, time of day, specific customer behaviors (e.g., abandoning a cart or completing a purchase), product launches, holidays, promotional campaigns, and so forth. In some cases, a campaign or particular message may be triggered in response to an update in a CRM or CDP system that indicates a change in customer status or preference. In some implementations, campaigns are manually scheduled. In some implementations, there can be multiple triggers. For example, messages may be sent to different audience segments based on different triggers. In some implementations, customized messages are generated once campaign creation information is received. However, in other implementations, customized messages are not created until a user requests to trigger a campaign. At operation 515, the platform can access a text transcript and can process the text transcript, for example to identify tokens within the transcript, at operation 520. In some implementations, the platform can operate on a cached copy of the text transcript. At operation 525, the platform can generate customized audio. Generating the customized audio can include generating audio from a script. Generating the customized audio can include substituting values for one or more tokens. At operation 530, the platform can generate graphics. The graphics can include logos, brand colors, images, avatars, audio visualizers, etc. At operation 535, the platform can combine the audio and graphics to generate final message content. At operation 540, the platform can generate a customized message, which can be delivered to a target at operation 545.

Figure 6:
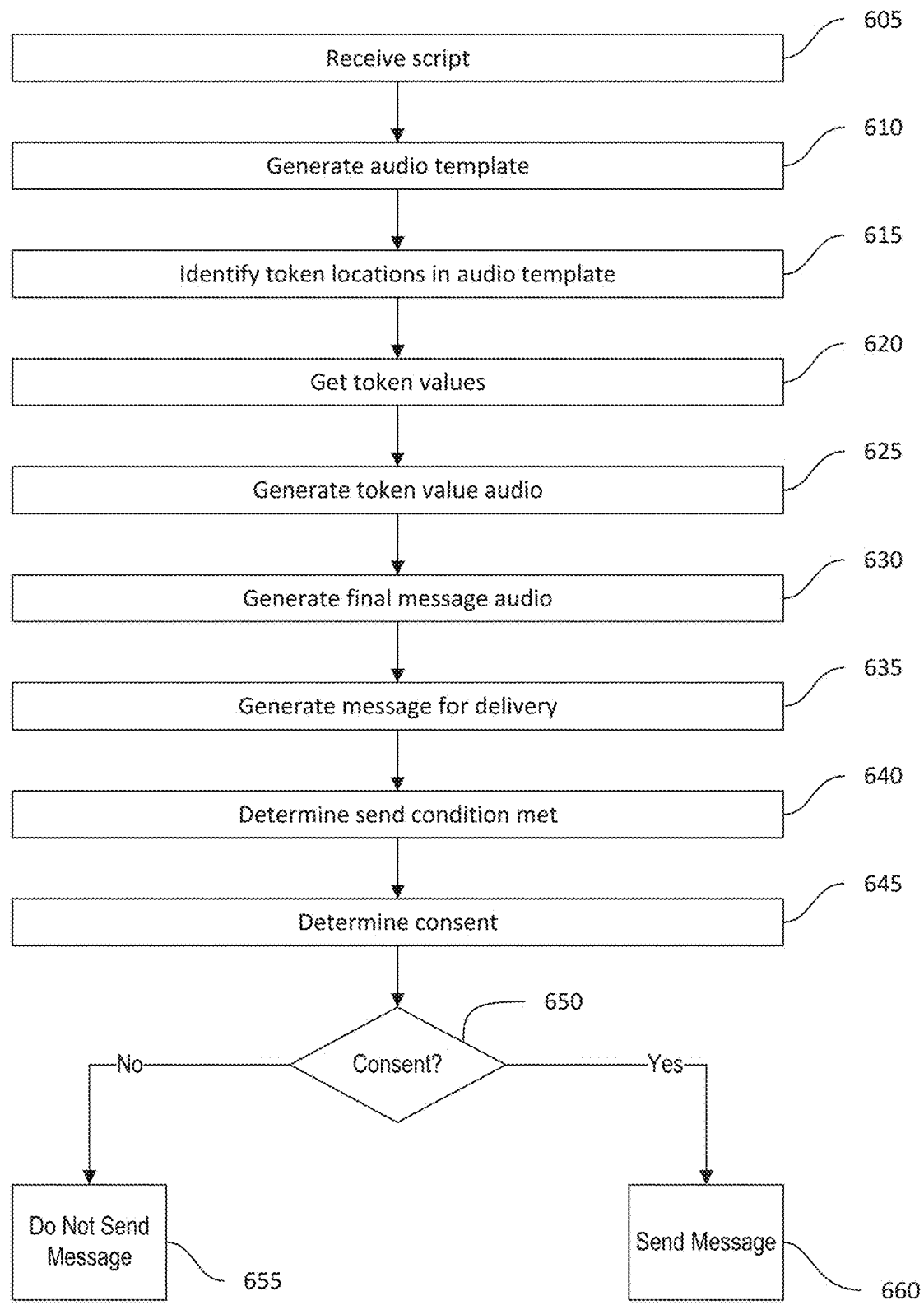
FIG. 6 is a flowchart that illustrates an example process for generating and sending customized messages according to some implementations.

FIG. 6 is a flowchart that illustrates an example process for generating and sending media messages according to some implementations. At operation 605, a platform can receive a script (e.g., a text-based script). At operation 610, the platform can generate one or more audio templates. For example, the platform can receive an indication of a delivery medium or mediums (e.g., e-mail, podcast, MMS, etc.) and can generate different audio templates for each platform, for example to conform to length or size requirements or limitations for different platforms. At operation 615, the platform can identify the location of one or more tokens in the audio template. For example, the platform can analyze the audio template to determine timestamps where token values are to be inserted. In some implementations, the platform determines a length of time during which audio in the audio template should be replaced with audio generated from token values. As an example, if an audio template says "Hello first name, this is John from the front desk," the platform can determine a timestamp after "Hello" and before "first" as the start of an insertion point for audio generated from a first name token value, and can determine that the generated audio token value should replace all audio in the audio template up to a second timestamp after "name" and before "this." In some implementations, the platform may expand or contract the audio such that there is no pause that seems out of place or that words do not sound strung together.

At operation 620, the platform can retrieve token values. The token values can be, for example, name (e.g., first name, last name, or both, current weather, forecasted weather, past purchase, product name, etc.). At operation 625, the platform can generate token value audio for a retrieved token value. As described herein, the token value audio can be generated based at least in part on analysis of the audio in the audio transcript preceding and following the insert point. This can help to ensure that the token value audio has a tone, pace, etc., that fits naturally with the rest of the audio message and the final message does not appear to obviously be spliced together from smaller audio clips. At operation 630, the platform can generate the final message audio by combining the generated token value audio and the audio template, substituting tokens in the audio template with the generated token values. The audio template can be expanded or shortened around the insertion point(s) to achieve a consistent flow of audio that does not have apparent gaps or words that run together.

At operation 635, the platform can generate a message for delivery. The message can include the final message audio. In some implementations, the generated message includes additional information. For example, if the delivery medium is MMS or another text-messaging medium, the final message can include the final message audio along with a call to action (e.g., a link), information for opting out, and so forth. In some implementations, generating the message for delivery can include packaging the message into a particular format, for example as a single-segment MMS message. In some implementations, generating the message includes generating graphics to accompany the audio message. For example, the final message audio can be used as an audio track for a video segment. The video segment can be branded, include visualizations, and so forth, as described herein. In some implementations, generating the final message comprises preparing the message in a format that will be accepted by a selected delivery channel.

At operation 640, the platform can determine if one or more send conditions are met. For example, a marketing campaign may be configured to trigger only on a certain date, only when there are certain weather conditions (e.g., sudden temperature drop, snow, rain, sunshine, etc.), in response to an event (e.g., a sporting event or concert), etc. At operation 645, for a particular recipient, the platform can determine if the recipient has consented to receiving messages. Not all delivery mediums may require consent. Thus, in some implementations, consent is not verified for certain delivery mediums. If the recipient has not provided consent at operation 650 (and consent is needed), the platform does not send the message at operation 655. In some implementations, the platform provides an alert to the creator of the campaign or a company associated with the campaign to indicate that a recipient was included in the campaign but did not provide necessary consent or has opted out of receiving messages (for example by replying "STOP" to a text message). If, at operation 650, any needed consent has been obtained, the platform can send the message at operation 660. In some implementations, the platform integrates with one or more third party platforms for delivery of the message.

It will be appreciated that various operations in FIG. 6 can be repeated. For example, for each unique combination of token values, the platform can repeat operations, such as operations 620-635 and/or other operations, such as operations 640, 645, 650, 655, and/or 660, to generate and deliver messages to a plurality of targets in a target audience. In FIG. 6, messages are generated in advance of when they are sent and in advance of determining consent. However, it will be appreciated that different approaches are possible and may be desirable in some circumstances. For example, it can save computational resources and costs to only generate final message audio or final messages after it has been determined that send conditions have been satisfied and/or that the target has consented (if consent is needed). Generating messages after send conditions are satisfied can also enable enhanced customization, such as inserting a current weather condition, news event, etc., into the customized message.

Figure 7:
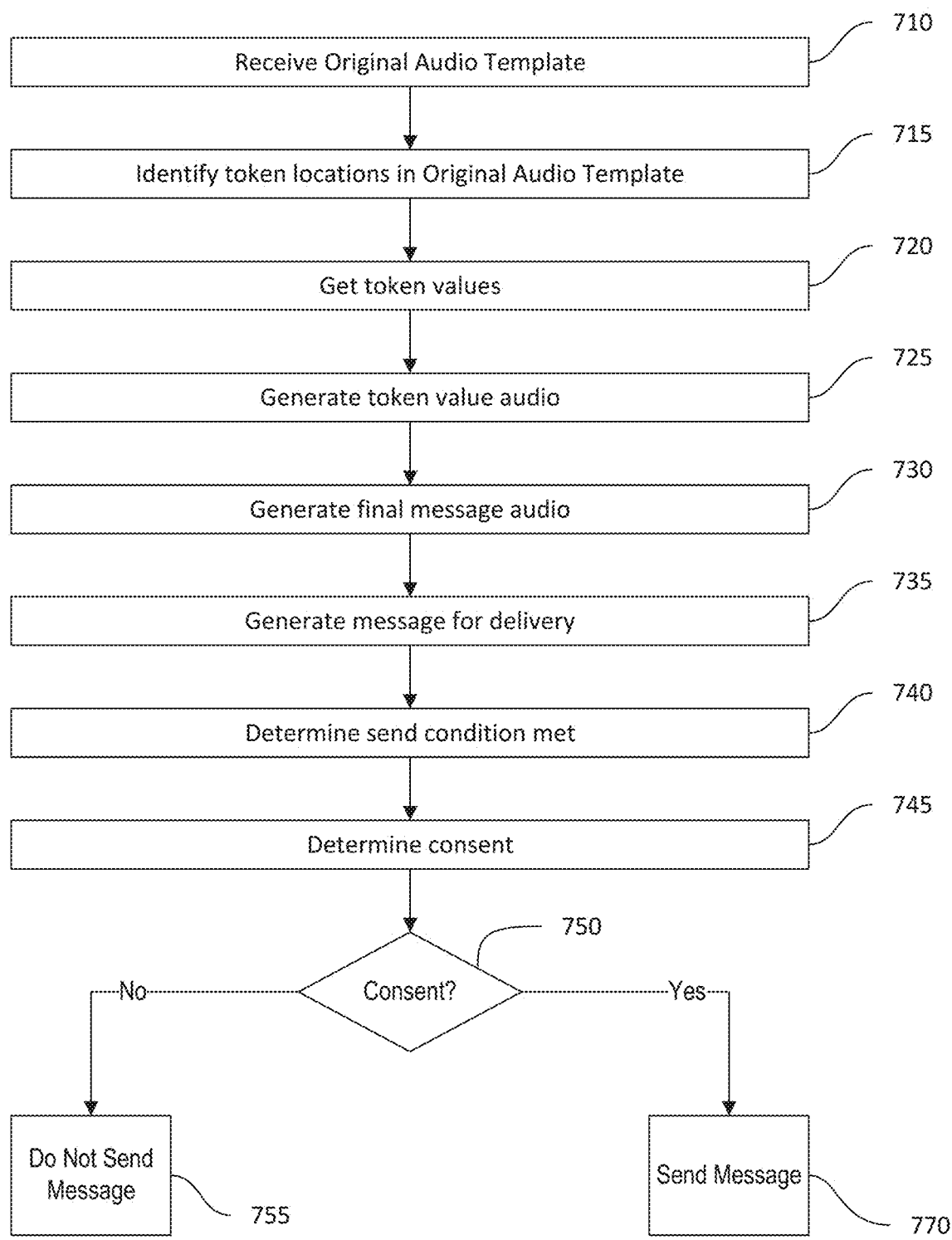
FIG. 7 is a flowchart that illustrates an example process for generating and sending customized messages according to some implementations.

FIG. 7 is a flowchart that illustrates an example process for generating and sending messages according to some implementations. FIG. 7 is generally similar to FIG. 6, and similar steps are not discussed again. In FIG. 7, rather than receiving a text-based script as in FIG. 6, the platform receives an original audio template at operation 710. That is, the platform receives an audio file or files, such as an original recording of a human voice. At operation 715, the platform identifies token locations in the original audio template (as opposed to in a generated audio template as was the case in FIG. 6). In some implementations, a user manually identifies the locations of tokens within the original audio. In some implementations, the platform is configured to analyze the original audio (e.g., using a speech transcription algorithm) to identify the locations of tokens within the original audio. In some cases, the original does not include a clear indication of where tokens are. For example, a voice actor may record an original audio template such as "Hello John, we're excited to launch our new Mason 1500 mower. Stop by a showroom today!" and the user or the platform can identify the presence of a name ("John") and a product name ("Mason 1500") in the original audio template. In some implementations, original audio templates include clear indications of where tokens are located, for example using a keyword, tone, etc. For example, the original audio template may say "Hello TOKEN FIRST NAME, we're excited to launch our new TOKEN PRODUCT NAME. Stop by a showroom today!" In such cases, the platform can generate a transcript of the original audio (e.g., using a speech to text model) and can readily identify the locations of tokens based on the keyword or keywords. In some implementations, the platform can automatically determine the appropriate token to be inserted. For example, if the original audio contains "TOKEN FIRST NAME," the platform can determine that the {firstName} token should be inserted. In some implementations, the platform may recognize a name, product name, price, etc., in an original audio and can map such terms to appropriate tokens.

Figure 8:
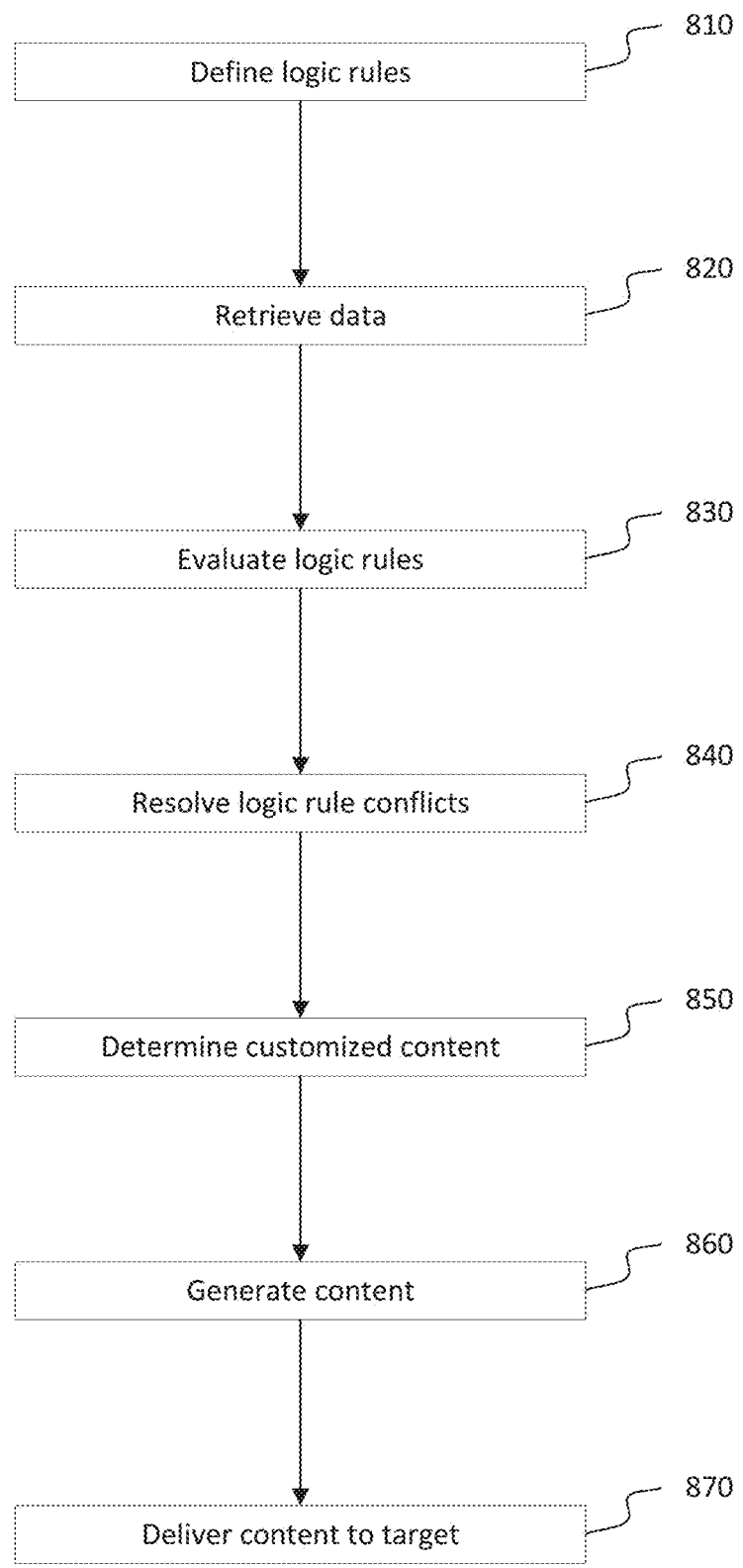
FIG. 8 is a flowchart that illustrates an example process for generating messages according to some implementations.

FIG. 8 is a flowchart that illustrates an example process for generating messages according to some implementations. At operation 810, the platform can define logic rules. For example, in some implementations, the platform provides a user interface that enables users of the platform to input logic rules to be applied in a campaign. In some implementations, logic rules can be used across campaigns. In some implementations, the platform provides a library of premade rules that can be used by a user. At operation 820, the platform can retrieve data from one or more third party resources, from one or more platform-specific resources, or both. For example, the platform can retrieve weather information, device information, location information, etc. At operation 830, the platform can evaluate logic rules that apply to a campaign. At operation 840, the platform can resolve any rule conflicts that arise. For example, if a conflict arises, the platform can use a conflict resolution algorithm to determine which rule takes priority. As described herein, the priority can be based on predefined user preferences or a fallback hierarchy (e.g., applying the most specific rule). At operation 850, the system can customize the message content. For example, the platform can adjust tone, script segments, voice selection, sounds effects, etc., based on the accessed data and the logic rules. At operation 860, the platform can generate final content. For example, the platform can provide a final script, voice selection, etc., to a text-to-speech engine to generate the final audio for the message. The platform can package the content in a desired format (e.g., an audio file, a video file, an MMS message, etc.). At operation 870, the platform can deliver the content to the target consumer. In some implementations, the platform sends the content directly. In other implementations, the platform sends the content to the target consumer using one or more third party services, such as a text messaging service, ad delivery network service, etc.

Figure 9:
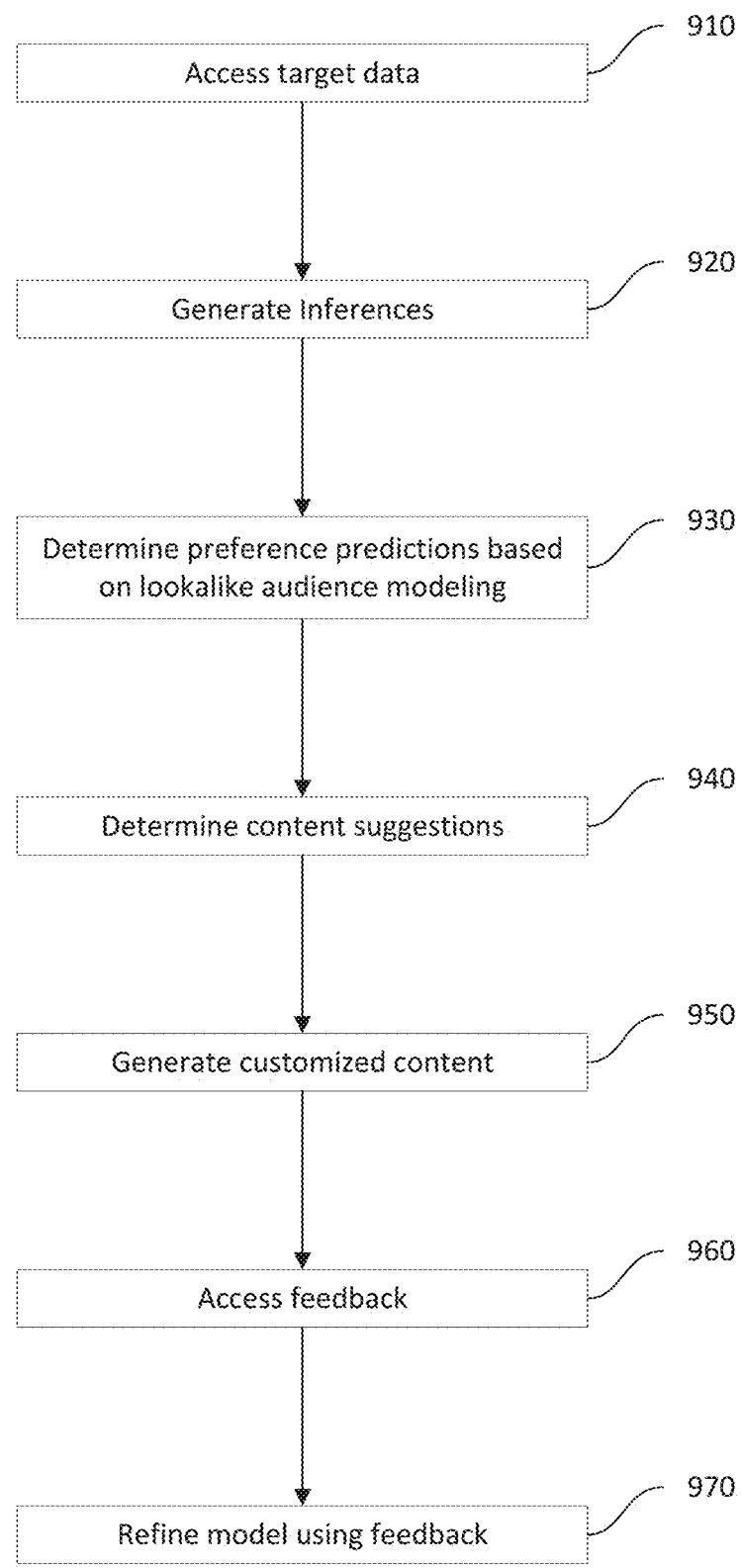
FIG. 9 is a flowchart that illustrates an example process for inferring target preferences according to some implementations.

FIG. 9 is a flowchart that illustrates an example process for inferring target preferences according to some implementations. At operation 910, the platform can access target data. The target data can include, for example, name, age, location, income, past purchase history, data about past engagement with campaigns, etc. Different data may be available for different targets. For example, a new customer or prospect may have less available data than an existing customer with a long purchase history and a history of engaging with campaigns. At operation 920, the platform can generate inferences about the target based on the target data. In some implementations, the platform uses a machine learning model to make inferences. At operation 930, the platform can determine preference predictions based on lookalike audience modeling. For example, the platform can utilize a clustering algorithm to determine which target segment (e.g., lookalike audience) the target is most similar to. At operation 940, the platform can determine content suggestions based on the preference predictions. At operation 950, the platform can generate a customized message that can be delivered to the target. At operation 960, the platform can access feedback. The feedback can be, for example, a read receipt, a conversion, a reply to the message, etc. At operation 970, the platform can refine a model used to determine content suggestions. For example, if the target reacted negatively to the message, the platform can tune the model so that targets are placed in better lookalike audiences.

Figure 10:
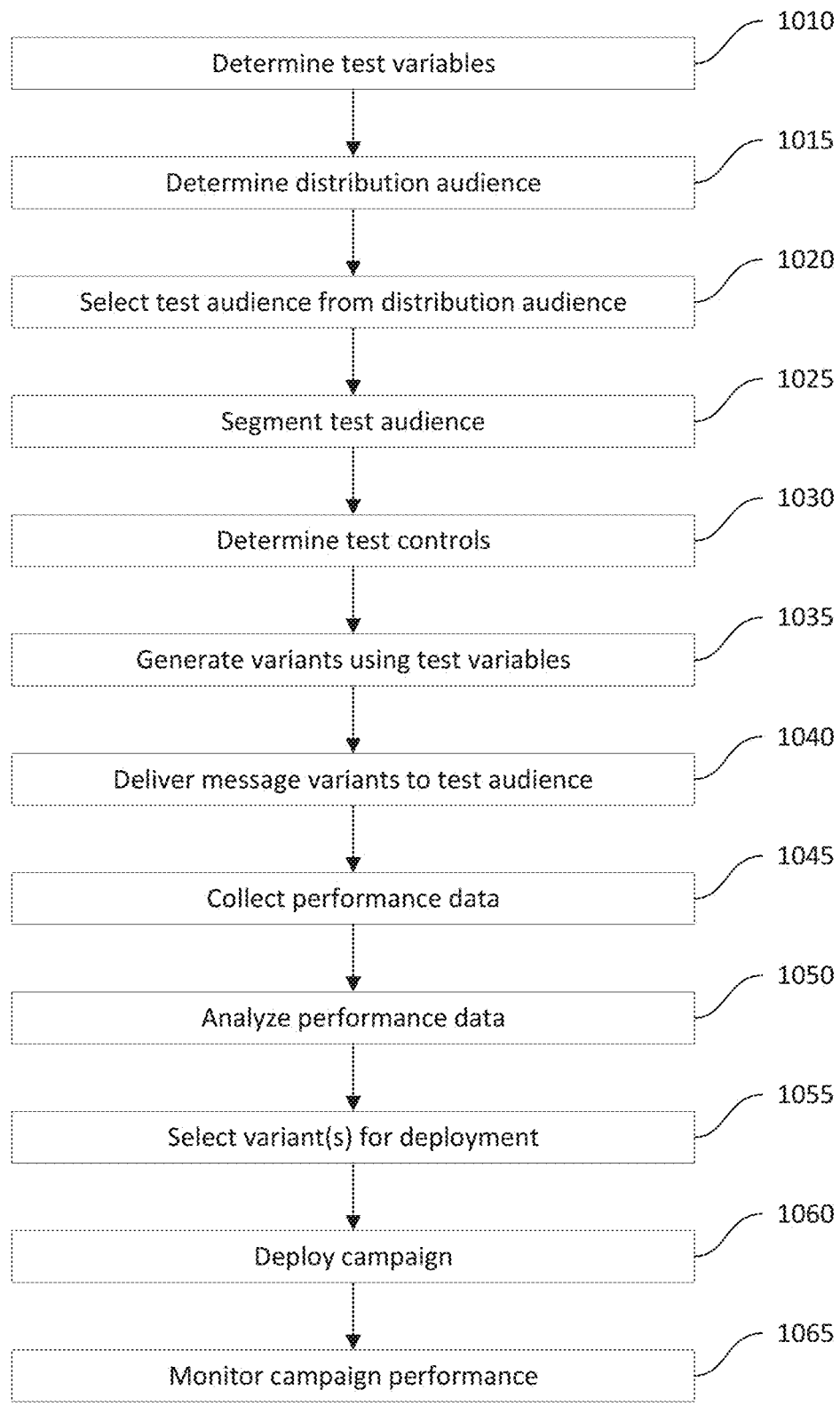
FIG. 10 is a flowchart that illustrates an example process for variant testing according to some implementations.

FIG. 10 is a flowchart that illustrates an example process for variant testing according to some implementations. The process in FIG. 10 can be used to test variants of a message to be used in a campaign. At operation 1010, the platform can determine one or more test variables. The test variables can include, for example, tone, length, voice, script, etc. Test variables can be automatically determined by the platform, specified by the user, or both. At operation 1015, the platform can determine a distribution audience for the campaign. At operation 1020, the platform can determine a test audience. The test audience can be selected from the distribution audience. In some cases, the test audience is randomly selected from the distribution audience. In some implementations, the test audience is quasi-random. For example, a user may specify certain age groups, genders, locations, etc., to be included in the test audience, and members of the test audience can be selected randomly but with one or more constraints to achieve a desired distribution of target segments. In some implementations, the user specifies the number of targets to be included in the test audience. In some implementations, the platform automatically determines how many targets to include in the test audience. For example, the platform can select the number of targets to include based on the total target audience size, the number of variants, the number of targets needed for results of testing to be statistically significant, and so forth. At operation 1025, the platform can segment the test audience. For example, the platform can assign members of the test audience to particular message variants. At operation 1030, the platform can determine one or more test controls. The test controls can, in some cases, be supplied by the user or can be default controls provided by the platform. The test controls can be, for example, a maximum number of messages to be sent during testing, a maximum duration for the testing, and so forth.

At operation 1035, the platform can generate variants using the test variables, for example using the message generation approaches described herein. At operation 1040, the platform can deliver the generated message variants to members of the test audience. At operation 1045, the platform can collect performance data. The performance data can include, for example, conversions, call to action engagement, listen completion, and so forth. At operation 1050, the platform can analyze the performance data. At operation 1055, the platform can select one or more variants to use in the full campaign deployment. In some implementations, the platform selects one or more variants without regard for different target segments. In some implementations, the platform can select different variants for different target segments (e.g., Message A may perform best among 18-30 year olds, while Message B performs best among 45-60 year olds). At operation 1060, the platform can deploy the campaign to the target audience. At operation 1065, the platform can monitor campaign performance. As described herein, in some implementations, the platform can optimize messaging after deployment, in case the test audience was not representative of the full distribution audience. For example, variants can be sent during a campaign, and the campaign can be adjusted based on feedback from targets who have already received messages.

Figure 11:
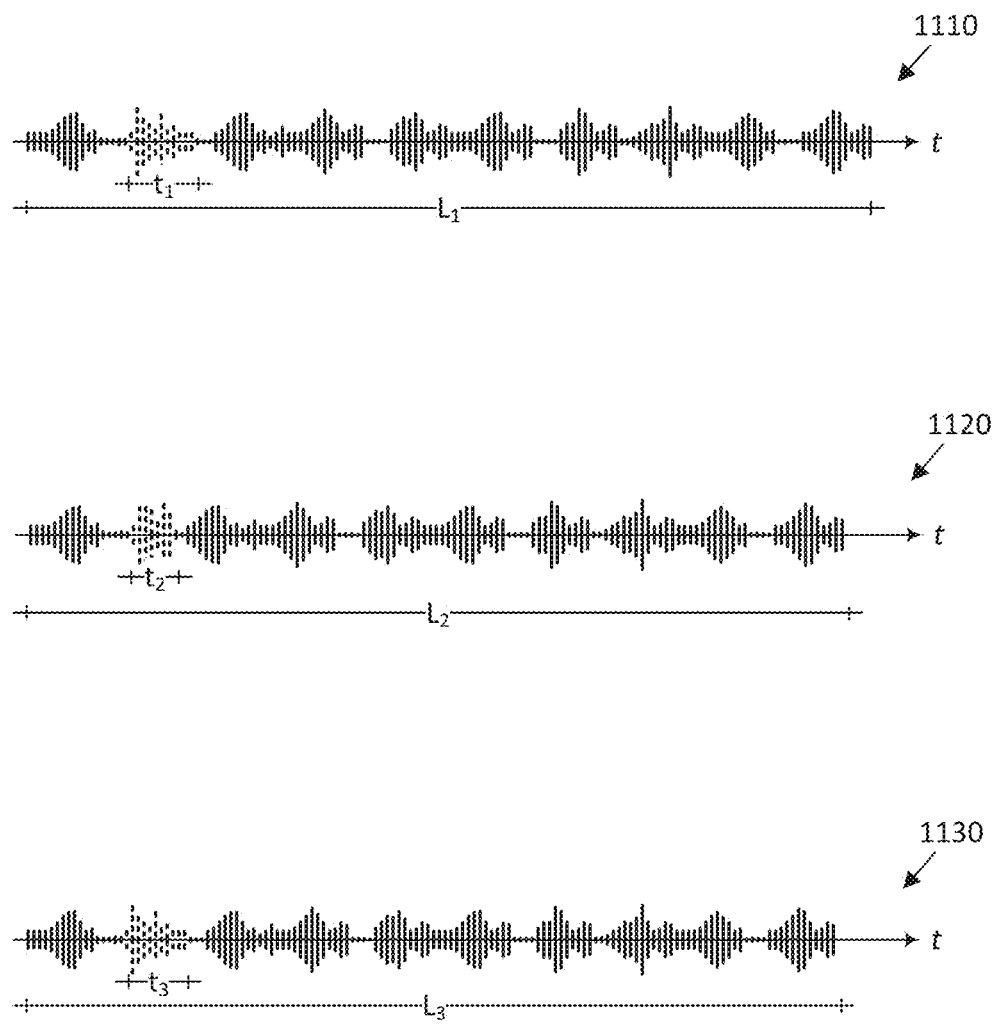
FIG. 11 is a drawing that schematically illustrates audio messages according to some implementations.

FIG. 11 is a drawing that schematically illustrates audio messages according to some implementations. A first audio message 1110 can be an audio template (e.g., a generated audio template or an original audio template). The first audio message 1110 can have a length $L_1$. The first audio message 1110 includes a single token, denoted using dashed lines, with length $t_1$. The platform can generate a second audio message 1120 from the first audio message 1110 by substituting in a token value. In FIG. 11, the token value audio has a length $t_2$. In FIG. 11, $t_2$ is less than $t_1$, and the platform adjusts the audio so that the token value fits naturally with the rest of the audio (e.g., without unusually long pauses before or after the token value) and the full message has a shorter length $L_2$. A third audio message 1130 represents a modified version of the first audio message 1110. In the third audio message 1130, the cadence is sped up such that the total length of the third audio message 1130 ($L_3$) is shorter than the total length $L_1$ of the first audio message 1110.

EXAMPLE CLAUSES

The following clauses are examples of how the current disclosure could be implemented. However, it will be appreciated that components of different clauses can be combined in a wide variety of ways and some components may be omitted in certain implementations.

Implementation 1. A computer-implemented method for generating a customized message for a target, the computer-implemented method comprising: accessing a script comprising one or more tokens; generating a request for a first user input of a first parameter value for a first parameter by a user; when the user provides the first user input of the first parameter value, assigning the first user input as the first parameter value of the first parameter; when the user does not provide the first user input of the first parameter value, assigning a default first parameter value as the first parameter value of the first parameter; generating a request for a first machine learning model to generate an audio template using at least the script and the first parameter value; providing the request to the first machine learning model, wherein providing the request to the first machine learning model causes generation of the audio template by the first machine learning model; accessing the audio template; identifying a timestamp of a token in the audio template; determining a duration of the token in the audio template; determining a token value for the target; generating a second request for a second machine learning model to generate an audio representation of the token value, wherein the second request includes at least the token value, an indication of a portion of the audio template preceding the token, and an indication of a portion of the audio template following the token; generating, using a second machine learning model, an audio representation of the token value; determining a length of the audio representation of the token value; adjusting a duration of the token in the audio template based on the length of the audio representation of the token value; inserting the audio representation of the token value into the audio template; generating a graphical representation based on a graphic information provided by the user, wherein the graphic information comprises one or more of: a background color, a foreground color, a logo, or an image; generating the customized message using the audio representation and the graphical representation; and causing delivery of the customized message to the target via a first delivery channel.

Implementation 2. The computer-implemented method of implementation 1, further comprising, prior to generating the request for the first machine learning model: determining the first delivery channel; determining a message constraint based on the first delivery channel; and modifying the script such that the customized message complies with the message constraint, wherein the message constraint comprises at least one of: a minimum message length, a maximum message length, a minimum file size, or a maximum file size, wherein modifying the script comprises: generating a prompt for a large language model, wherein the prompt comprises the script and the message constraint; and generating, using the large language model, a modified script that complies with the message constraint.

Implementation 3. The computer-implemented method of implementation 1, wherein the first parameter comprises one of: a tone, a cadence, a sentiment, or a message length.

Implementation 4. A computer-implemented method for generating a customized message for a target, the computer-implemented method comprising: accessing a script comprising one or more tokens; generating a request for a first machine learning model to generate an audio template using at least the script; providing the request to the first machine learning model, wherein providing the request to the first machine learning model causes generation of the audio template by the first machine learning model; accessing the audio template; identifying a timestamp of a token in the audio template; determining a duration of the token in the audio template; determining a token value for the target; generating a second request for a second machine learning model to generate an audio representation of the token value, wherein the second request includes at least the token value, an indication of a portion of the audio template preceding the token, and an indication of a portion of the audio template following the token; generating, using a second machine learning model, an audio representation of the token value; determining a length of the audio representation of the token value; adjusting a duration of the token in the audio template based on the length of the audio representation of the token value; inserting the audio representation of the token value into the audio template to generate a final message audio; generating the customized message using the final message audio; and causing delivery of the customized message to the target via a first delivery channel.

Implementation 5. The computer-implemented method of implementation 4, further comprising: generating a graphical representation based on a graphic information provided by a user, wherein the graphic information comprises one or more of: a background color, a foreground color, a logo, or an image, wherein the customized message comprises the graphical representation.

Implementation 6. The computer-implemented method of implementation 4, further comprising: generating a request for a first user input of a first parameter value for a first parameter by a user; when the user provides the first user input of the first parameter value, assigning the first user input as the first parameter value of the first parameter; and when the user does not provide the first user input of the first parameter value, assigning a default first parameter value as the first parameter value of the first parameter, wherein the request for the first machine learning model to generate the audio template further comprises the first parameter value.

Implementation 7. The computer-implemented method of implementation 4, wherein the request for the first machine learning model to generate the audio template further comprises a parameter, wherein the parameter comprises at least one of: a tone, a cadence, a sentiment, or a message length.

Implementation 8. The computer-implemented method of implementation 4, further comprising, prior to causing delivery of the customized message to the target via a first delivery channel: accessing consent information; and determining that the target consents to receiving the customized message based on the consent information.

Implementation 9. The computer-implemented method of implementation 4, wherein the token comprises one of: a first name, a last name, a full name, a location, a current weather condition, a forecasted weather, a season, an event, a brand name, a product name, a product type, a price, a sale start date, a sale end date, a destination, an arrival date, a departure date, a holiday, a service name, a service type, or a birthday.

Implementation 10. The computer-implemented method of implementation 4, further comprising: determining a second token value for a second target; determining that the second token value has a same value as the token value; and causing delivery of the customized message to the second target via the first delivery channel.

Implementation 11. The computer-implemented method of implementation 4, further comprising: determining a delivery medium of the customized message; determining, based on the delivery medium of the customized message, a constraint on the customized message; and adjusting the customized message such that the customized message satisfies the constraint.

Implementation 12. The computer-implemented method of implementation 11, wherein the delivery medium is a multimedia messaging service (MMS) message, wherein adjusting the customized message comprises causing the customized message to be deliverable as a single MMS segment.

Implementation 13. The computer-implemented method of implementation 4, further comprising, prior to causing delivery of the customized message: identifying a send condition; and determining that the send condition is satisfied.

Implementation 14. The computer-implemented method of implementation 13, wherein the send condition is based on one or more of a date, a time of day, an event, or a weather condition.

Implementation 15. The computer-implemented method of implementation 4, wherein the request for the first machine learning model to generate the audio template further comprises a parameter, wherein the parameter comprises a bit rate of the audio template.

Implementation 16. The method of implementation 5, wherein the graphical representation comprises a spectrogram visualization of the final message audio.

Implementation 17. The computer-implemented method of implementation 4, further comprising: receiving a response from the target; determining a sentiment of the target based on the response; and generating a subsequent message, wherein a tone of the subsequent message is determined based at least in part on the sentiment of the target.

Implementation 18. A computer-implemented method for generating a customized message for a target, the computer-implemented method comprising: accessing an original audio recording, wherein the original audio recording comprises a location for insertion of a token value, wherein the location comprises a timestamp and a duration; providing the original audio recording to a machine learning model, wherein the machine learning model is configured to output a transcript of the original audio recording; identifying the location for insertion of the token value based on at least in part on the transcript; determining a token value for the target; generating a request for a second machine learning model to generate an audio representation of the token value, wherein the request includes at least the token value, an indication of a portion of the original audio recording preceding the location, and an indication of a portion of the original audio recording following the location; generating, using the second machine learning model, the audio representation of the token value; determining a length of the audio representation of the token value; generating a final audio content, wherein generating the final audio content comprises inserting the audio representation of the token value into the original audio recording, wherein inserting comprises increasing or decreasing the duration based on the length of the audio representation of the token value; generating the customized message based at least in part on the final audio content; and causing delivery of the customized message to the target.

Implementation 19. The computer-implemented method of implementation 18, further comprising: generating a graphical representation based on a graphic information provided by a user, wherein the graphic information comprises one or more of: a background color, a foreground color, a logo, or an image, wherein the customized message comprises the graphical representation.

Implementation 20. The computer-implemented method of implementation 19, wherein the graphical representation comprises a spectrogram, wherein the spectrogram is generated by analyzing the final audio content.

Computer System

Figure 12:
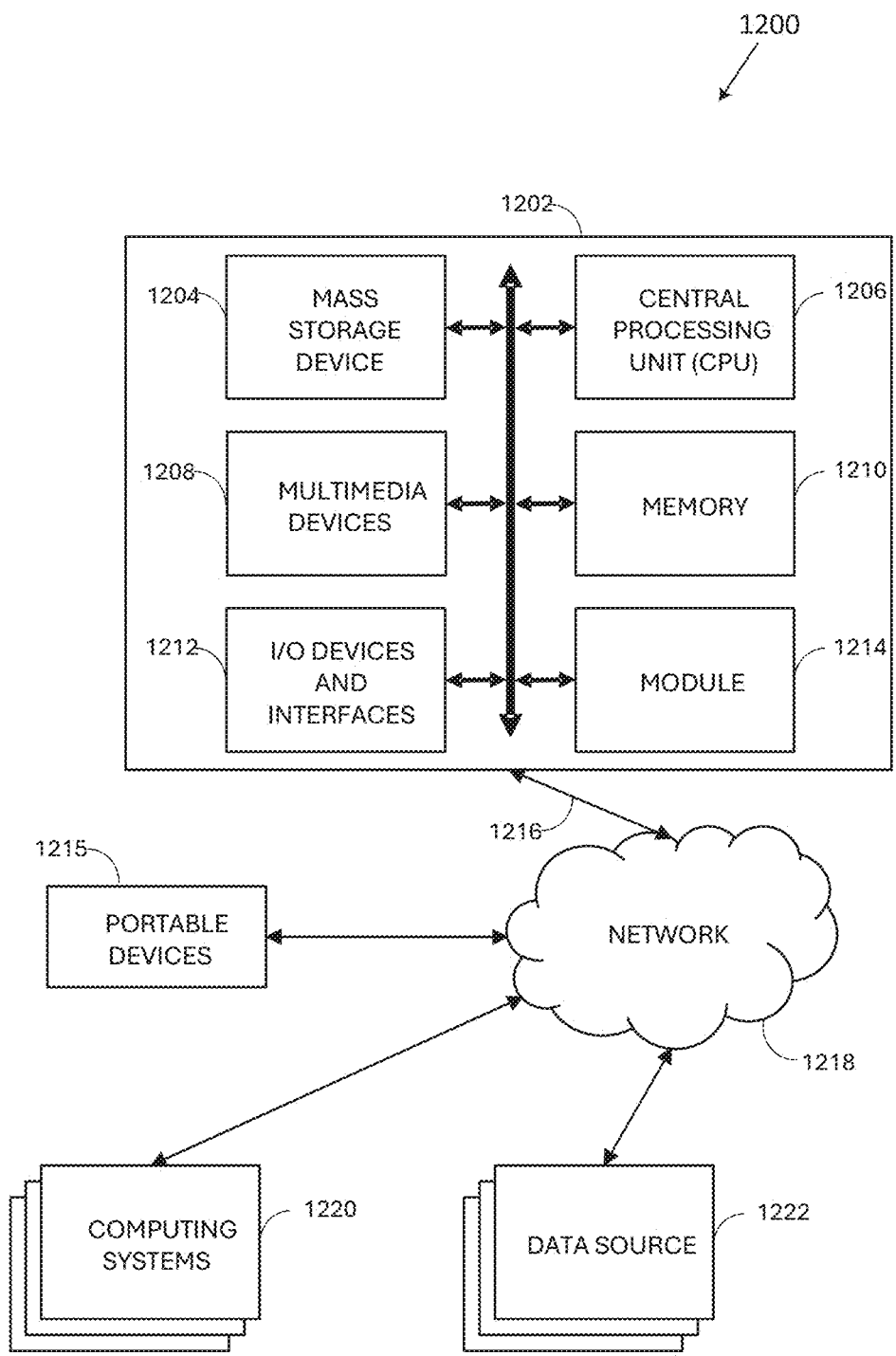
FIG. 12 is a block diagram depicting an embodiment of a computer hardware system configured to run software for implementing one or more of the systems and methods described herein.

FIG. 12 is a block diagram 1200 depicting an embodiment of a computer hardware system 1202 configured to run software for implementing one or more of the systems and methods described herein. The example computer system 1202 is in communication with one or more computing systems 1220 and/or one or more data sources 1222 via one or more networks 1218. While FIG. 12 illustrates an embodiment of a computing system 1202, it is recognized that the functionality provided for in the components and modules of computer system 1202 may be combined into fewer components and modules, or further separated into additional components and modules.

The computer system 1202 can comprise a module 1214 that carries out the functions, methods, acts, and/or processes described herein. The module 1214 is executed on the computer system 1202 by a central processing unit 1206 discussed further below.

In general, the word "module," as used herein, refers to logic embodied in hardware or firmware or to a collection of software instructions, having entry and exit points. Modules are written in a program language, such as JAVA, C or C++, PYTHON, or the like. Software modules may be compiled or linked into an executable program, installed in a dynamic link library, or may be written in an interpreted language such as BASIC, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems and may be stored on or within any suitable computer readable medium or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

The computer system 1202 includes one or more processing units (CPU) 1206, which may comprise a microprocessor. The computer system 1202 further includes a physical memory 1210, such as random-access memory (RAM) for temporary storage of information, a read only memory (ROM) for permanent storage of information, and a mass storage device 1204, such as a backing store, hard drive, rotating magnetic disks, solid state disks (SSD), flash memory, phase-change memory (PCM), 3D XPoint memory, diskette, or optical media storage device. Alternatively, the mass storage device may be implemented in an array of servers. Typically, the components of the computer system 1202 are connected to the computer using a standards-based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1202 includes one or more input/output (I/O) devices and interfaces 1212, such as a keyboard, mouse, touch pad, and printer. The I/O devices and interfaces 1212 can include one or more display devices, such as a monitor, which allows the visual presentation of data to a user. More particularly, a display device provides for the presentation of GUIs as application software data, and multi-media presentations, for example. The I/O devices and interfaces 1212 can also provide a communications interface to various external devices. The computer system 1202 may comprise one or more multi-media devices 1208, such as speakers, video cards, graphics accelerators, and microphones, for example.

The computer system 1202 may run on a variety of computing devices, such as a server, a Windows server, a Structure Query Language server, a Unix Server, a personal computer, a laptop computer, and so forth. In other embodiments, the computer system 1202 may run on a cluster computer system, a mainframe computer system and/or other computing system suitable for controlling and/or communicating with large databases, performing high volume transaction processing, and generating reports from large databases. The computing system 1202 is generally controlled and coordinated by an operating system software, such as z/OS, Windows, Linux, UNIX, BSD, SunOS, Solaris, MacOS, or other compatible operating systems, including proprietary operating systems. Operating systems control and schedule computer processes for execution, perform memory management, provide file system, networking, and I/O services, and provide a user interface, such as a graphical user interface (GUI), among other things.

The computer system 1202 illustrated in FIG. 12 is coupled to a network 1218, such as a LAN, WAN, or the Internet via a communication link 1216 (wired, wireless, or a combination thereof). Network 1218 communicates with various computing devices and/or other electronic devices, such as portable devices 1215. Network 1218 is communicating with one or more computing systems 1220 and one or more data sources 1222. The module 1214 may access or may be accessed by computing systems 1220 and/or data sources 1222 through a web-enabled user access point. Connections may be a direct physical connection, a virtual connection, and other connection type. The web-enabled user access point may comprise a browser module that uses text, graphics, audio, video, and other media to present data and to allow interaction with data via the network 1218.

Access to the module 1214 of the computer system 1202 by computing systems 1220 and/or by data sources 1222 may be through a web-enabled user access point such as the computing systems' 1220 or data source's 1222 personal computer, cellular phone, smartphone, laptop, tablet computer, e-reader device, audio player, or another device capable of connecting to the network 1218. Such a device may have a browser module that is implemented as a module that uses text, graphics, audio, video, and other media to present data and to allow interaction with data via the network 1218.

The output module may be implemented as a combination of an all-points addressable display such as a cathode ray tube (CRT), a liquid crystal display (LCD), a plasma display, or other types and/or combinations of displays. The output module may be implemented to communicate with interfaces 1212 and they also include software with the appropriate interfaces which allow a user to access data through the use of stylized screen elements, such as menus, windows, dialogue boxes, tool bars, and controls (for example, radio buttons, check boxes, sliding scales, and so forth). Furthermore, the output module may communicate with a set of input and output devices to receive signals from the user.

The input device(s) may comprise a keyboard, roller ball, pen and stylus, mouse, trackball, voice recognition system, or pre-designated switches or buttons. The output device(s) may comprise a speaker, a display screen, a printer, or a voice synthesizer. In addition, a touch screen may act as a hybrid input/output device. In another embodiment, a user may interact with the system more directly such as through a system terminal connected to the score generator without communications over the Internet, a WAN, or LAN, or similar network.

In some implementations, the system 1202 may comprise a physical or logical connection established between a remote microprocessor and a mainframe host computer for the express purpose of uploading, downloading, or viewing interactive data and databases on-line in real time. The remote microprocessor may be operated by an entity operating the computer system 1202, including the client server systems or the main server system, an/or may be operated by one or more of the data sources 1222 and/or one or more of the computing systems 1220. In some implementations, terminal emulation software may be used on the microprocessor for participating in the micro-mainframe link.

In some implementations, computing systems 1220 who are internal to an entity operating the computer system 1202 may access the module 1214 internally as an application or process run by the CPU 1206.

In some implementations, one or more features of the systems, methods, and devices described herein can utilize a URL and/or cookies, for example for storing and/or transmitting data or user information. A Uniform Resource Locator (URL) can include a web address and/or a reference to a web resource that is stored on a database and/or a server. The URL can specify the location of the resource on a computer and/or a computer network. The URL can include a mechanism to retrieve the network resource. The source of the network resource can receive a URL, identify the location of the web resource, and transmit the web resource back to the requestor. A URL can be converted to an IP address, and a Domain Name System (DNS) can look up the URL and its corresponding IP address. URLs can be references to web pages, file transfers, emails, database accesses, and other applications. The URLs can include a sequence of characters that identify a path, domain name, a file extension, a host name, a query, a fragment, scheme, a protocol identifier, a port number, a username, a password, a flag, an object, a resource name, and/or the like. The systems disclosed herein can generate, receive, transmit, apply, parse, serialize, render, and/or perform an action on a URL.

A cookie, also referred to as an HTTP cookie, a web cookie, an internet cookie, and a browser cookie, can include data sent from a website and/or stored on a user's computer. This data can be stored by a user's web browser while the user is browsing. The cookies can include useful information for websites to remember prior browsing information, such as a shopping cart on an online store, clicking of buttons, login information, and/or records of web pages or network resources visited in the past. Cookies can also include information that the user enters, such as names, addresses, passwords, credit card information, etc. Cookies can also perform computer functions. For example, authentication cookies can be used by applications (for example, a web browser) to identify whether the user is already logged in (for example, to a web site). The cookie data can be encrypted to provide security for the creator. Tracking cookies can be used to compile historical browsing histories of individuals. Systems disclosed herein can generate and use cookies to access data of an individual. Systems can also generate and use JSON web tokens to store authenticity information, HTTP authentication as authentication protocols, IP addresses to track session or identity information, URLs, and the like.

The computing system 1202 may include one or more internal and/or external data sources (for example, data sources 1222). In some implementations, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 1202 may also access one or more databases 1222. The databases 1222 may be stored in a database or data repository. The computer system 1202 may access the one or more databases 1222 through a network 1218 or may directly access the database or data repository through I/O devices and interfaces 1212. The data repository storing the one or more databases 1222 may reside within the computer system 1202.

CONCLUSION

In the foregoing specification, the systems and processes have been described with reference to specific embodiments thereof. It will, however, be evident that various modifications and changes may be made thereto without departing from the broader spirit and scope of the embodiments disclosed herein. The specification and drawings are, accordingly, to be regarded in an illustrative rather than restrictive sense.

Indeed, although the systems and processes have been disclosed in the context of certain embodiments and examples, it will be understood by those skilled in the art that the various embodiments of the systems and processes extend beyond the specifically disclosed embodiments to other alternative embodiments and/or uses of the systems and processes and obvious modifications and equivalents thereof. In addition, while several variations of the embodiments of the systems and processes have been shown and described in detail, other modifications, which are within the scope of this disclosure, will be readily apparent to those of skill in the art based upon this disclosure. It is also contemplated that various combinations or sub-combinations of the specific features and aspects of the embodiments may be made and still fall within the scope of the disclosure. It should be understood that various features and aspects of the disclosed embodiments can be combined with, or substituted for, one another in order to form varying modes of the embodiments of the disclosed systems and processes. Any methods disclosed herein need not be performed in the order recited. Thus, it is intended that the scope of the systems and processes herein disclosed should not be limited by the particular embodiments described above.

It will be appreciated that the systems and methods of the disclosure each have several innovative aspects, no single one of which is solely responsible or required for the desirable attributes disclosed herein. The various features and processes described above may be used independently of one another or may be combined in various ways. All possible combinations and sub-combinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination. No single feature or group of features is necessary or indispensable to each and every embodiment.

It will also be appreciated that conditional language used herein, such as, among others, "can," "could," "might," "may," "for example," and the like, unless specifically stated otherwise, or otherwise understood within the context as used, is generally intended to convey that certain embodiments include, while other embodiments do not include, certain features, elements and/or operations. Thus, such conditional language is not generally intended to imply that features, elements and/or operations are in any way required for one or more embodiments or that one or more embodiments necessarily include logic for deciding, with or without author input or prompting, whether these features, elements and/or operations are included or are to be performed in any particular embodiment. The terms "comprising," "including," "having," and the like are synonymous and are used inclusively, in an open-ended fashion, and do not exclude additional elements, features, acts, operations, and so forth. In addition, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Further, while the methods and devices described herein may be susceptible to various modifications and alternative forms, specific examples thereof have been shown in the drawings and are herein described in detail. It should be understood, however, that the embodiments are not to be limited to the particular forms or methods disclosed, but, to the contrary, the embodiments are to cover all modifications, equivalents, and alternatives falling within the spirit and scope of the various implementations described and the appended claims. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (for example, as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (for example, as much as reasonably possible under the circumstances). For example, "substantially constant" includes "constant." Unless stated otherwise, all measurements are at standard conditions including temperature and pressure.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y, and at least one of Z to each be present. The headings provided herein, if any, are for convenience only and do not necessarily affect the scope or meaning of the devices and methods disclosed herein.

Accordingly, the claims are not intended to be limited to the embodiments shown herein but are to be accorded the widest scope consistent with this disclosure, the principles and the novel features disclosed herein.

What is claimed is:

1. A computer-implemented method for generating a customized message for a target, the computer-implemented method comprising:
    accessing a script comprising one or more tokens;
    generating a request for a first user input of a first parameter value for a first parameter by a user;
    when the user provides the first user input of the first parameter value, assigning the first user input as the first parameter value of the first parameter;
    when the user does not provide the first user input of the first parameter value, assigning a default first parameter value as the first parameter value of the first parameter;
    generating a request for a first machine learning model to generate an audio template using at least the script and the first parameter value;
    providing the request to the first machine learning model, wherein providing the request to the first machine learning model causes generation of the audio template by the first machine learning model;
    accessing the audio template;
    identifying a timestamp of a token in the audio template;
    determining a duration of the token in the audio template;
    determining a token value for the target;
    generating a second request for a second machine learning model to generate an audio representation of the token value, wherein the second request includes at least the token value, an indication of a portion of the audio template preceding the token, and an indication of a portion of the audio template following the token;
    generating, using a second machine learning model, an audio representation of the token value;
    determining a length of the audio representation of the token value;
    adjusting a duration of the token in the audio template based on the length of the audio representation of the token value;
    inserting the audio representation of the token value into the audio template;
    generating a graphical representation based on a graphic information provided by the user, wherein the graphic information comprises one or more of: a background color, a foreground color, a logo, or an image;
    generating the customized message using the audio representation and the graphical representation; and
    causing delivery of the customized message to the target via a first delivery channel.

2. The computer-implemented method of claim 1, further comprising, prior to generating the request for the first machine learning model:

determining the first delivery channel;
determining a message constraint based on the first delivery channel; and
modifying the script such that the customized message complies with the message constraint,
wherein the message constraint comprises at least one of: a minimum message length, a maximum message length, a minimum file size, or a maximum file size,
wherein modifying the script comprises:
generating a prompt for a large language model, wherein the prompt comprises the script and the message constraint; and
generating, using the large language model, a modified script that complies with the message constraint.

3. The computer-implemented method of claim 1, wherein the first parameter comprises one of: a tone, a cadence, a sentiment, or a message length.

4. A computer-implemented method for generating a customized message for a target, the computer-implemented method comprising:
accessing a script comprising one or more tokens;
generating a request for a first machine learning model to generate an audio template using at least the script;
providing the request to the first machine learning model, wherein providing the request to the first machine learning model causes generation of the audio template by the first machine learning model;
accessing the audio template;
identifying a timestamp of a token in the audio template;
determining a duration of the token in the audio template;
determining a token value for the target;
generating a second request for a second machine learning model to generate an audio representation of the token value, wherein the second request includes at least the token value, an indication of a portion of the audio template preceding the token, and an indication of a portion of the audio template following the token;
generating, using a second machine learning model, an audio representation of the token value;
determining a length of the audio representation of the token value;
adjusting a duration of the token in the audio template based on the length of the audio representation of the token value;
inserting the audio representation of the token value into the audio template to generate a final message audio;
generating the customized message using the final message audio; and
causing delivery of the customized message to the target via a first delivery channel.

5. The computer-implemented method of claim 4, further comprising:
generating a graphical representation based on a graphic information provided by a user, wherein the graphic information comprises one or more of: a background color, a foreground color, a logo, or an image,
wherein the customized message comprises the graphical representation.

6. The method of claim 5, wherein the graphical representation comprises a spectrogram visualization of the final message audio.

7. The computer-implemented method of claim 4, further comprising:
generating a request for a first user input of a first parameter value for a first parameter by a user;
when the user provides the first user input of the first parameter value, assigning the first user input as the first parameter value of the first parameter; and
when the user does not provide the first user input of the first parameter value, assigning a default first parameter value as the first parameter value of the first parameter,
wherein the request for the first machine learning model to generate the audio template further comprises the first parameter value.

8. The computer-implemented method of claim 4, wherein the request for the first machine learning model to generate the audio template further comprises a parameter, wherein the parameter comprises at least one of: a tone, a cadence, a sentiment, or a message length.

9. The computer-implemented method of claim 4, further comprising, prior to causing delivery of the customized message to the target via a first delivery channel:
accessing consent information; and
determining that the target consents to receiving the customized message based on the consent information.

10. The computer-implemented method of claim 4, wherein the token comprises one of: a first name, a last name, a full name, a location, a current weather condition, a forecasted weather, a season, an event, a brand name, a product name, a product type, a price, a sale start date, a sale end date, a destination, an arrival date, a departure date, a holiday, a service name, a service type, or a birthday.

11. The computer-implemented method of claim 4, further comprising:
determining a second token value for a second target;
determining that the second token value has a same value as the token value; and
causing delivery of the customized message to the second target via the first delivery channel.

12. The computer-implemented method of claim 4, further comprising:
determining a delivery medium of the customized message;
determining, based on the delivery medium of the customized message, a constraint on the customized message; and
adjusting the customized message such that the customized message satisfies the constraint.

13. The computer-implemented method of claim 12, wherein the delivery medium is a multimedia messaging service (MMS) message, wherein adjusting the customized message comprises causing the customized message to be deliverable as a single MMS segment.

14. The computer-implemented method of claim 4, further comprising, prior to causing delivery of the customized message:
identifying a send condition; and
determining that the send condition is satisfied.

15. The computer-implemented method of claim 14, wherein the send condition is based on one or more of a date, a time of day, an event, or a weather condition.

16. The computer-implemented method of claim 4, wherein the request for the first machine learning model to generate the audio template further comprises a parameter, wherein the parameter comprises a bit rate of the audio template.

17. The computer-implemented method of claim 4, further comprising:
receiving a response from the target;
determining a sentiment of the target based on the response; and generating a subsequent message, wherein a tone of the subsequent message is determined based at least in part on the sentiment of the target.

18. A computer-implemented method for generating a customized message for a target, the computer-implemented method comprising:

accessing an original audio recording, wherein the original audio recording comprises a location for insertion of a token value, wherein the location comprises a timestamp and a duration;

providing the original audio recording to a machine learning model, wherein the machine learning model is configured to output a transcript of the original audio recording;

identifying the location for insertion of the token value based on at least in part on the transcript;

determining a token value for the target;

generating a request for a second machine learning model to generate an audio representation of the token value, wherein the request includes at least the token value, an indication of a portion of the original audio recording preceding the location, and an indication of a portion of the original audio recording following the location;

generating, using the second machine learning model, the audio representation of the token value;

determining a length of the audio representation of the token value;

generating a final audio content, wherein generating the final audio content comprises inserting the audio representation of the token value into the original audio recording, wherein inserting comprises increasing or decreasing the duration based on the length of the audio representation of the token value;

generating the customized message based at least in part on the final audio content; and causing delivery of the customized message to the target.

19. The computer-implemented method of claim 18, further comprising:

generating a graphical representation based on a graphic information provided by a user, wherein the graphic information comprises one or more of: a background color, a foreground color, a logo, or an image, wherein the customized message comprises the graphical representation.

20. The computer-implemented method of claim 19, wherein the graphical representation comprises a spectrogram, wherein the spectrogram is generated by analyzing the final audio content.

* * * * *